(12) United States Patent
Yin et al.

(10) Patent No.: US 10,113,624 B2
(45) Date of Patent: Oct. 30, 2018

(54) TORSIONAL VIBRATION DAMPER AND LOCK-UP CLUTCH FOR HYDROKINETIC TORQUE-COUPLING DEVICE, AND METHOD FOR MAKING THE SAME

(71) Applicant: VALEO EMBRAYAGES, Amiens (FR)

(72) Inventors: Xuexian Yin, Troy, MI (US); Alexandre Depraete, Bloomfield, MI (US); Patrick Durham, Troy, MI (US)

(73) Assignee: Valeo Embrayages, Amiens (FR)

( * ) Notice: Subject to any disclaimer, the term of this patent is extended or adjusted under 35 U.S.C. 154(b) by 9 days.

(21) Appl. No.: 15/354,798

(22) Filed: Nov. 17, 2016

(65) Prior Publication Data
US 2018/0135738 A1 May 17, 2018

(51) Int. Cl.
| | |
|---|---|
| F16H 45/02 | (2006.01) |
| F16H 41/28 | (2006.01) |
| F16F 15/121 | (2006.01) |
| F16D 25/0635 | (2006.01) |
| F16D 13/40 | (2006.01) |

(52) U.S. Cl.
CPC ......... *F16H 45/02* (2013.01); *F16F 15/1215* (2013.01); *F16H 41/28* (2013.01); *F16D 13/40* (2013.01); *F16D 25/0635* (2013.01); *F16H 2045/0221* (2013.01)

(58) Field of Classification Search
None
See application file for complete search history.

(56) References Cited

U.S. PATENT DOCUMENTS

| | | | |
|---|---|---|---|
| 2,551,718 | A | 5/1951 | Auten |
| 4,145,936 | A | 3/1979 | Vincent et al. |
| 5,697,261 | A | 12/1997 | Mokdad et al. |
| 5,893,355 | A | 4/1999 | Glover et al. |
| 2003/0106763 | A1 | 6/2003 | Kimura et al. |
| 2015/0369296 | A1 | 12/2015 | Lopez-Perez |

FOREIGN PATENT DOCUMENTS

| | | |
|---|---|---|
| DE | 19729421 A1 | 1/1998 |
| DE | 19919449 A1 | 11/1999 |
| DE | 102004024747 A1 | 12/2005 |

(Continued)

*Primary Examiner* — Ramya P Burgess
*Assistant Examiner* — Timothy Hannon
(74) *Attorney, Agent, or Firm* — Berenato & White, LLC

(57) ABSTRACT

A torque-coupling device for coupling driving and driven shafts. The torque-coupling device comprises a casing having a locking surface, a torque converter, a locking piston having an engagement surface axially movable to and from the locking surface of the casing and a torsional vibration damper. The torsional vibration damper comprises a torque input member and a unitary radially elastic output member elastically coupled to the torque input member. The torque input member includes a radially oriented first retainer plate and at least one supporting member mounted thereto. The output member includes an output hub and an elastic leaf configured to elastically engage the supporting member upon rotation of the first retainer plate with respect to the output member. The output hub is configured for directly and non-rotatably engaging a driven shaft. The locking piston is non-rotatably connected to the torque input member of the torsional vibration damper.

20 Claims, 26 Drawing Sheets

(56) References Cited

FOREIGN PATENT DOCUMENTS

| | | |
|---|---|---|
| EP | 1048420 A2 | 11/2000 |
| FR | 2339107 A1 | 8/1977 |
| FR | 2493446 A1 | 5/1982 |
| FR | 2499182 A1 | 8/1982 |
| FR | 2628804 A1 | 9/1989 |
| FR | 2714435 A1 | 6/1995 |
| FR | 2828543 A1 | 2/2003 |
| FR | 2938030 A1 | 5/2010 |
| FR | 3000155 A1 | 6/2014 |
| GB | 1212042 A | 11/1970 |
| GB | 2235749 A | 3/1991 |
| GB | 2262795 A | 6/1993 |
| GB | 2283558 A | 5/1995 |
| GB | 2284875 A | 6/1995 |
| GB | 2468030 A | 8/2010 |
| JP | 09280317 A | 10/1997 |
| WO | WO9914114 A1 | 3/1999 |
| WO | WO2004016968 A1 | 2/2004 |
| WO | WO2011006264 A1 | 1/2011 |
| WO | WO2014128380 A1 | 8/2014 |

TORSIONAL VIBRATION DAMPER AND LOCK-UP CLUTCH FOR HYDROKINETIC TORQUE-COUPLING DEVICE, AND METHOD FOR MAKING THE SAME

BACKGROUND OF THE INVENTION

1. Field of the Invention

The present invention generally relates to fluid coupling devices, and more particularly to a torsional vibration damper for hydrokinetic torque-coupling devices, and a method for making the same.

2. Background of the Invention

A conventional hydrokinetic torque-coupling device 1 is schematically and partially illustrated in FIG. 1 and is configured to transmit torque from an output shaft of an internal combustion engine in a motor vehicle, such as for instance a crankshaft 2a, to a transmission input shaft 2b. The conventional hydrokinetic torque-coupling device comprises a hydrokinetic torque converter 4 and a torsional vibration damper 5. The hydrokinetic torque converter conventionally comprises an impeller wheel 4i, a turbine wheel 4t, a stator (or reactor) 4s fixed to a casing of the torque converter 4, and a one-way clutch for restricting rotational direction of the stator 8 to one direction. The impeller wheel 4i is configured to hydro-kinetically drive the turbine wheel 4t through the reactor 4s. The impeller wheel 4i is coupled to the crankshaft 1 and the turbine wheel 4t is coupled to a guide washer 6.

The torsional vibration damper 5 of the compression spring type comprises a first group of coil springs 7a, 7b mounted between the guide washer 6 and an output hub 8 coupled to the transmission input shaft 2b. The coil springs 7a, 7b of the first group are arranged in series through a phasing member 9, so that the coil springs 7a, 7b are deformed in phase with each other, with the phasing member 9 being movable relative to the guiding washer 6 and relative to the output hub 8. A second group of coil springs 7c is mounted with some clearance between the guide washer 6 and the output hub 8 in parallel with the first group of elastic members 7a, 7b, with the coil springs 7c being adapted to be active on a limited angular range, more particularly at the end of the angular travel of the guide washer 6 relative to the output hub 8. The angular travel, or the angular shift noted α, of the guide washer 6 relative to the output hub 8, is defined relative to a rest position (α=0) wherein no torque is transmitted through damping means formed by the coil springs 7a, 7b. The second group of coil springs 7c makes it possible to increase the stiffness of the damping means at the end of angular travel, i.e. for a significant a angular offset of the guide washer 6 relative to the output hub 8 (or vice versa).

The torque-coupling device 1 further comprises a lock-up clutch 3 adapted to transmit torque from the crankshaft 2a to the guide washer 6 in a determined operation phase, without action from the impeller wheel 4i and the turbine wheel 4t.

The turbine wheel 4t is integrally or operatively connected with the output hub 8 linked in rotation to a driven shaft, which is itself linked to an input shaft of a transmission of a vehicle. The casing of the torque converter 4 generally includes a front cover and an impeller shell which together define a fluid filled chamber. Impeller blades are fixed to an impeller shell within the fluid filled chamber to define the impeller assembly. The turbine wheel 4t and the stator 4s are also disposed within the chamber, with both the turbine wheel 4t and the stator 4s being relatively rotatable with respect to the front cover and the impeller wheel 4i. The turbine wheel 4t includes a turbine shell with a plurality of turbine blades fixed to one side of the turbine shell facing the impeller blades of the impeller wheel 4i.

The turbine wheel 4t works together with the impeller wheel 4i, which is linked in rotation to the casing that is linked in rotation to a driving shaft driven by an internal combustion engine. The stator 4s is interposed axially between the turbine wheel 4t and the impeller wheel 4i, and is mounted so as to rotate on the driven shaft with the interposition of the one-way clutch.

While conventional hydrokinetic torque-coupling devices, including but not limited to those discussed above, have proven to be acceptable for vehicular driveline applications and conditions, improvements that may enhance their performance and cost are possible.

BRIEF SUMMARY OF THE INVENTION

According to a first aspect of the invention, there is provided a hydrokinetic torque-coupling device for coupling a driving shaft and a driven shaft together. The torque-coupling device comprises a casing rotatable about a rotational axis and having a locking surface, a torque converter including an impeller wheel rotatable about the rotational axis and a turbine wheel disposed in the casing coaxially with the rotational axis, a locking piston axially movable along the rotational axis to and from the locking surface of the casing, and a torsional vibration damper. The locking piston has an engagement surface configured to selectively frictionally engage the locking surface of the casing to position the hydrokinetic torque-coupling device into and out of lockup mode, in which the locking piston is mechanically frictionally locked to the casing so as to be non-rotatable relative to the casing. The torsional vibration damper comprises a torque input member, and a unitary radially elastic output member pivotable relative to and elastically coupled to the torque input member. The torque input member includes a radially oriented first retainer plate and at least one supporting member mounted thereto. The radially elastic output member includes an annular output hub coaxial with the rotational axis and rotatable relative the torque input member, and at least one curved elastic leaf integral with the output hub and configured to elastically and radially engage the at least one supporting member and to elastically bend (or deform) in the radial direction upon rotation of the first retainer plate with respect to the radially elastic output member. The at least one curved elastic leaf has a proximal end non-movably connected to the output hub, a free distal end and a curved raceway portion disposed between the proximal and free distal ends of the at least one elastic leaf for bearing the at least one supporting member. The annular output hub of the radially elastic output member is configured for directly and non-rotatably engaging the driven shaft. The locking piston is non-rotatably connected to the torque input member of the torsional vibration damper.

According to a second aspect of the present invention, there is provided a method for assembling a hydrokinetic torque-coupling device for coupling a driving shaft and a driven shaft together. The method involves the steps of providing a casing having a locking surface, providing a torque converter comprising an impeller wheel and a turbine wheel, providing a locking piston having an engagement surface configured to selectively frictionally engage the locking surface of the casing to position the hydrokinetic torque-coupling device into and out of a lockup mode in which the locking piston is mechanically frictionally locked to the casing so as to be non-rotatable relative to the casing, and providing a torsional vibration damper. The torsional vibration damper comprises a torque input member including a radially oriented first retainer plate and at least one supporting member mounted thereto, and a unitary radially elastic output member rotatable relative to and elastically coupled to the torque input member. The radially elastic output member includes an annular output hub coaxial with the rotational axis and rotatable relative the torque input member, and at least one curved elastic leaf integral with the output hub and configured to elastically and radially engage the at least one supporting member and to elastically bend in the radial direction upon rotation of the first retainer plate with respect to the radially elastic output member. The at least one curved elastic leaf has a proximal end non-movably connected to the output hub, a free distal end and a curved raceway portion disposed between the proximal and free distal ends of the at least one elastic leaf for bearing the at least one supporting member. The annular output hub of the radially elastic output member is configured for directly and non-rotatably engaging the driven shaft. The method further involves the step of non-rotatably connecting the locking piston to the torque input member of the torsional vibration damper so that the engagement surface of the locking piston facing the locking surface of the casing.

Other aspects of the invention, including apparatus, devices, systems, converters, processes, and the like which constitute part of the invention, will become more apparent upon reading the following detailed description of the exemplary embodiments.

BRIEF DESCRIPTION OF THE SEVERAL VIEWS OF THE DRAWING(S)

The accompanying drawings are incorporated in and constitute a part of the specification. The drawings, together with the general description given above and the detailed description of the exemplary embodiments and methods given below, serve to explain the principles of the invention. The objects and advantages of the invention will become apparent from a study of the following specification when viewed in light of the accompanying drawings, in which like elements are given the same or analogous reference numerals and wherein.

Figure 25:
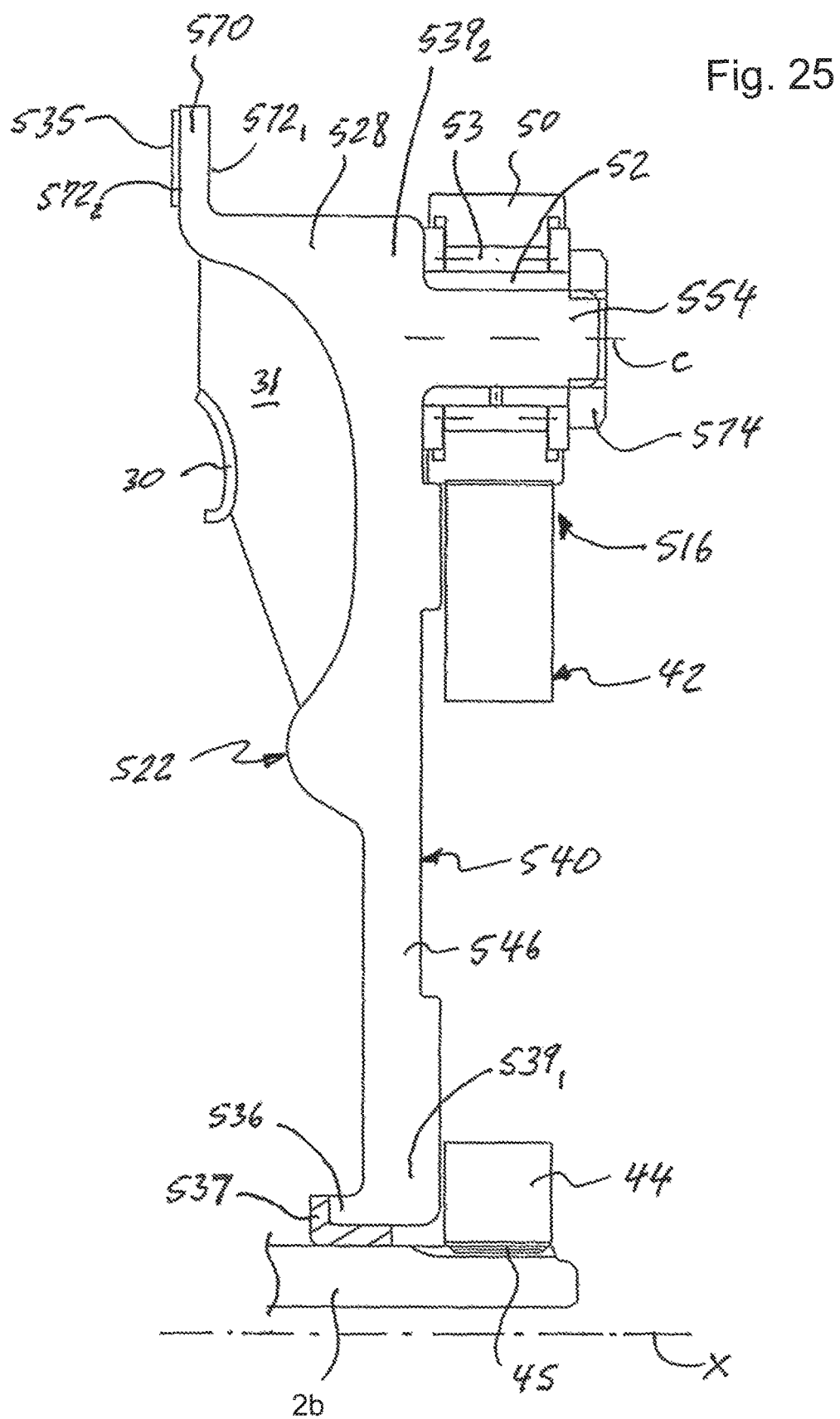
Figure 26:
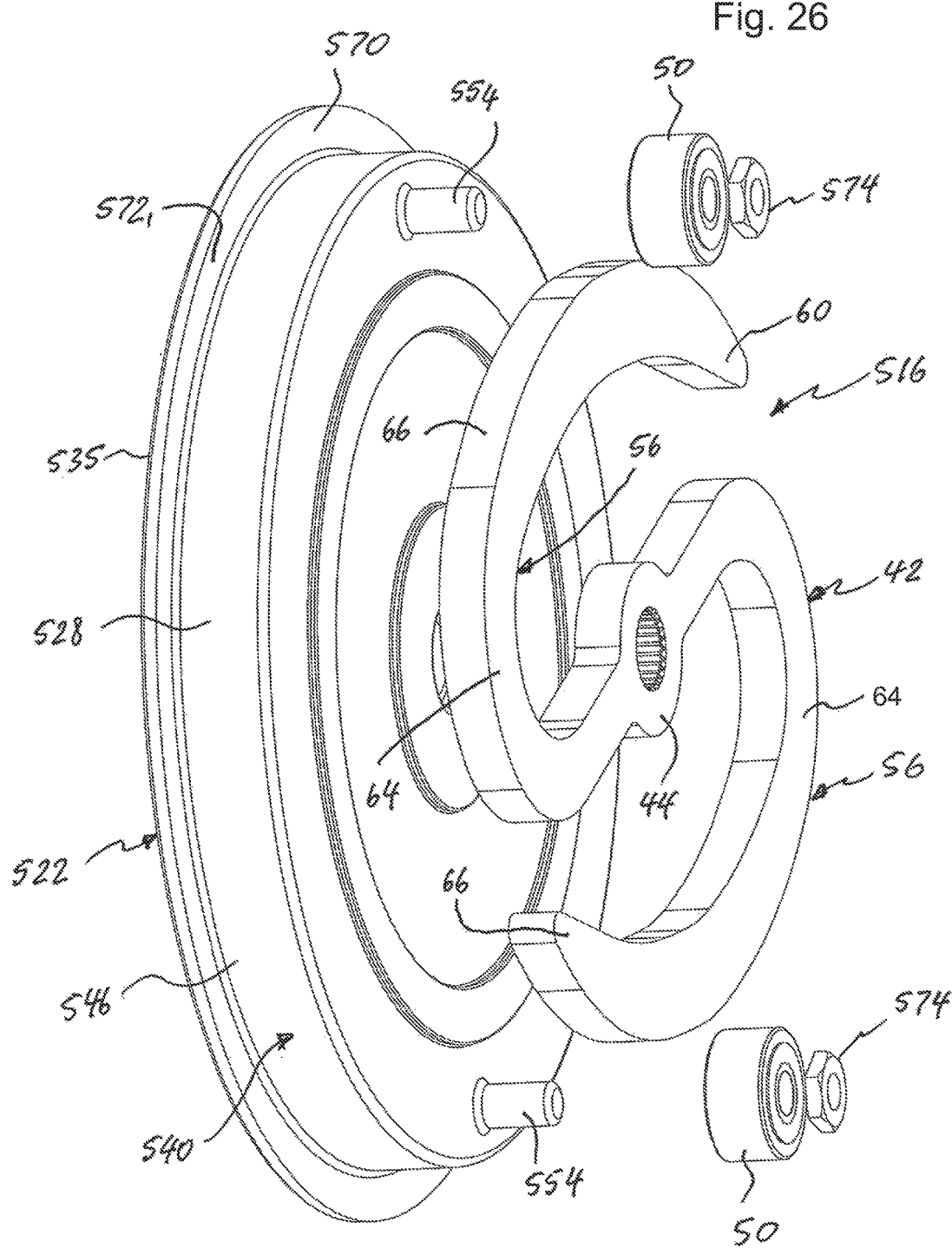

FIG. 25 is a fragmented partial half-view in axial section of the hydrokinetic torque-coupling device showing a lock-up clutch and the torsional vibration damper in accordance with the sixth exemplary embodiment of the present invention; and FIG. 26 is a partial exploded perspective view of the hydrokinetic torque-coupling device showing a turbine wheel with a unitary locking piston and the torsional vibration damper in accordance with the sixth exemplary embodiment of the present invention.

DETAILED DESCRIPTION OF EXEMPLARY EMBODIMENT(S) AND EMBODIED METHOD(S) OF THE INVENTION

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description. In the description, relative terms such as "horizontal," "vertical," "up," "down," "upper", "lower", "right", "left", "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. Additionally, the word "a" and "an" as used in the claims means "at least one" and the word "two" as used in the claims means "at least two".

Figure 1:
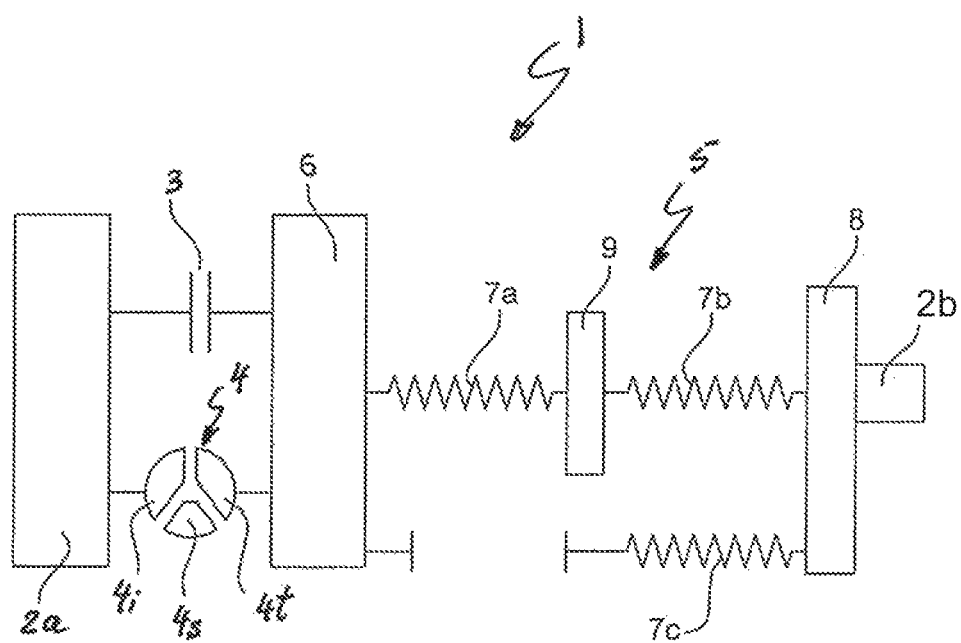
FIG. 1 is a schematic representation of a torque-coupling device of the prior art.
Figure 2:
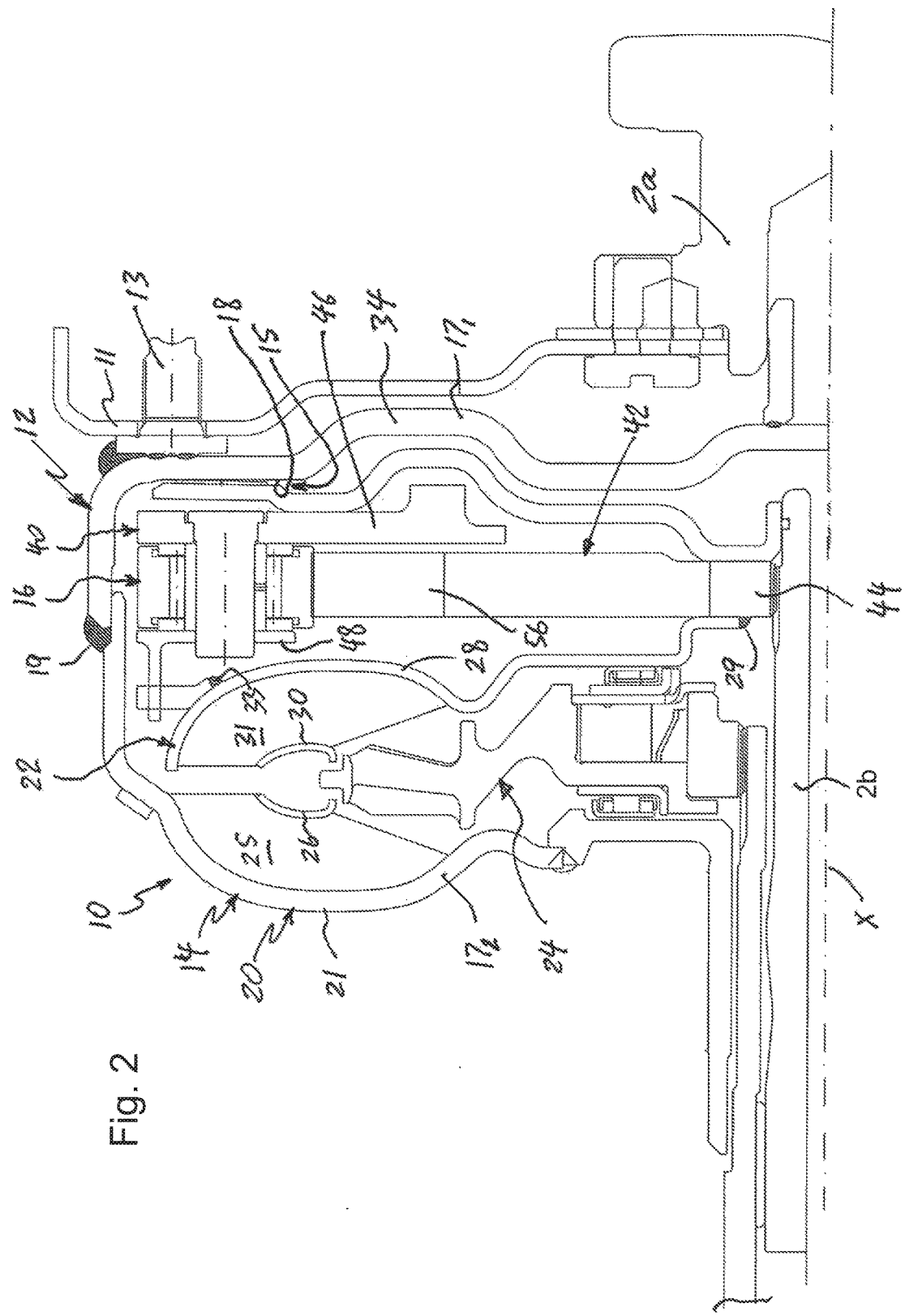
FIG. 2 is a fragmented half-view in axial section of a hydrokinetic torque-coupling device with a torsional vibration damper in accordance with a first exemplary embodiment of the present invention.

A first exemplary embodiment of a hydrokinetic torque-coupling device is generally represented in FIG. 2 by reference numeral 10. The hydrokinetic torque-coupling device 10 is intended to couple a driving shaft 2a and a driven shaft 2b, for example in a motor vehicle. In this case, the driving shaft 2a is an output shaft of an internal combustion engine (ICE) of the motor vehicle and the driven shaft 2b is a transmission input shaft of an automatic transmission of the motor vehicle.

The hydrokinetic torque-coupling device 10 comprises a sealed casing 12 filled with a fluid, such as oil or transmission fluid, and rotatable about a rotational axis X of rotation, a hydrokinetic torque converter 14 disposed in the casing 12, a lock-up clutch 15 and a torque transmitting device (or torsional vibration damper) 16 also disposed in the casing 12. The torsional vibration damper 16 of the present invention is in the form of a leaf (or blade) damper. The sealed casing 12, the torque converter 14, the lock-up clutch 15 and the torsional vibration damper 16 are all rotatable about the rotational axis X. The drawings discussed herein show half-views, that is, a cross-section of the portion or fragment of the hydrokinetic torque-coupling device 10 above the rotational axis X. As is known in the art, the torque-coupling device 10 is symmetrical about the rotational axis X. Hereinafter the axial and radial orientations are considered with respect to the rotational axis X of the torque-coupling device 10. The relative terms such as "axially," "radially," and "circumferentially" are with respect to orientations parallel to, perpendicular to, and circularly around the rotational axis X, respectively.

The sealed casing 12 according to the first exemplary embodiment as illustrated in FIG. 2 includes a first shell (or casing shell) $17_1$, and a second shell (or impeller shell) $17_2$ disposed coaxially with and axially opposite to the first shell $17_1$. The first and second shells $17_1$, $17_2$ are non-movably (i.e., fixedly) interconnected and sealed together about their outer peripheries, such as by weld 19. The first shell $17_1$ is non-movably (i.e., fixedly) connected to the driving shaft, more typically to the output shaft of the ICE through a flexplate 11 that is non-rotatably fixed to the driving shaft 2a, so that the casing 12 turns at the same speed at which the engine operates for transmitting torque. Specifically, in the illustrated embodiment of FIG. 2, the casing 12 is rotatably driven by the ICE and is non-rotatably coupled to the driving shaft 2a thereof, such as with the flexplate 11 and studs 13. Typically, the studs 13 are fixedly secured, such as by welding, to the first shell $17_1$. Each of the first and second shells $17_1$, $17_2$ are integral or one-piece and may be made, for example, by press-forming one-piece metal sheets.

The torque converter 14 comprises an impeller assembly (sometimes referred to as the pump or impeller wheel) 20, a turbine assembly (sometimes referred to as the turbine wheel) 22, and a stator (sometimes referred to as the reactor) 24 interposed axially between the impeller wheel 20 and the turbine wheel 22. The impeller wheel 20, the turbine wheel 22, and the stator 24 are coaxially aligned with one another and the rotational axis X. The impeller wheel 20, the turbine wheel 22, and the stator 24 collectively form a torus. The impeller wheel 20 and the turbine wheel 22 may be fluidly coupled to one another in operation as known in the art.

The impeller wheel 20 includes a substantially annular, semi-toroidal (or concave) impeller shell 21, a substantially annular impeller core ring 26, and a plurality of impeller blades 25 fixedly (i.e., non-movably) attached, such as by brazing, to the impeller shell 21 and the impeller core ring 26. Thus, at least a portion of the second shell $17_2$ of the casing 12 also forms and serves as the impeller shell 21 of the impeller assembly 20. Accordingly, the impeller shell 21 sometimes is referred to as part of the casing 12. The impeller wheel 20, including the impeller shell 21, the impeller core ring 26 and the impeller blades 25, are non-rotatably secured to the second shell $17_2$ and hence to the driving shaft $2a$ (or flywheel) of the engine to rotate at the same speed as the engine output. The impeller shell 21, impeller core ring 26 and the impeller blades 25 are conventionally formed by stamping from steel blanks.

The turbine wheel 22, as best shown in FIG. 2, comprises a substantially annular, semi-toroidal (or concave) turbine shell 28 rotatable about the rotational axis X, a substantially annular turbine core ring 30, and a plurality of turbine blades 31 fixedly (i.e., non-movably) attached, such as by brazing, to the turbine shell 28 and the turbine core ring 30. The turbine shell 28, the turbine core ring 30 and the turbine blades 31 are conventionally formed by stamping from steel blanks.

Figure 3:
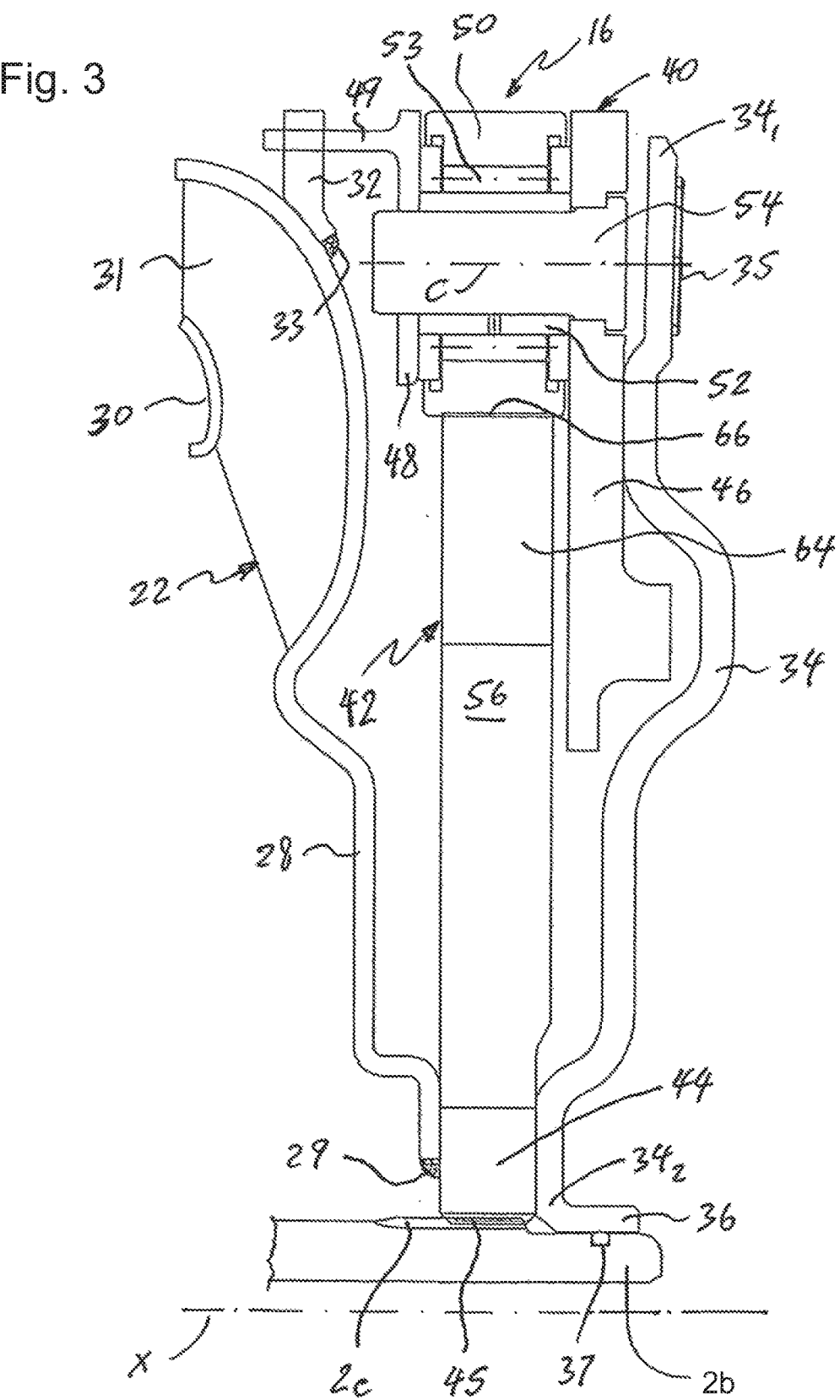
FIG. 3 is fragmented partial half-view in axial section of the hydrokinetic torque-coupling device showing the lock-up clutch and the torsional vibration damper in accordance with the first exemplary embodiment of the present invention.

The lock-up clutch 15 includes a substantially annular locking piston 34 having an engagement surface 34e facing a locking surface 18 defined on the first shell $17_1$ of the casing 12. The locking piston 34 is axially movable along the rotational axis X to and from the locking surface 18 so as to selectively engage the locking piston 34 against the locking surface 18 of the casing 12. The lock-up clutch 15 further includes an annular friction liner 35 fixedly attached to the engagement surface 34e of the locking piston 34 by appropriate means known in the art, such as by adhesive bonding. As best shown in FIGS. 2 and 3, the friction liner 35 is fixedly attached to the engagement surface 34e of the locking piston 34 at a radially outer peripheral end $34_1$ thereof.

The annular friction liner 35 is made of a friction material for improved frictional performance. Alternatively, an annular friction liner may be secured to the locking surface 18 of the casing 12. According to still another embodiment, a first friction ring or liner is secured to the locking surface 18 of the casing 12 and a second friction ring or liner is secured to the engagement surface 34e of the locking piston 34. It is within the scope of the invention to omit one or both of the friction rings. In other words, the annular friction liner 35 may be secured to any, all, or none of the engagement surfaces. Further with the exemplary embodiment, the engagement surface 34e of the locking piston 34 is slightly conical to improve the engagement of the lock-up clutch 15. Specifically, the engagement surface 34e of the locking piston 34 holding the annular friction liner 35 is conical, at an angle between 10° and 30°, to improve the torque capacity of the lock-up clutch 15. Alternatively, the engagement surface 34e of the locking piston 34 may be parallel to the locking surface 18 of the casing 12.

The lock-up clutch 15 is provided for locking the driving and driven shafts 2a, 2b. The lock-up clutch 15 is usually activated after starting of the motor vehicle and after hydraulic coupling of the driving and driven shafts, in order to avoid the loss of efficiency caused in particular by slip phenomena between the turbine wheel 20 and the impeller wheel 22. The locking piston 34 is axially displaceable toward (an engaged (or locked) position of the lock-up clutch 15) and away (a disengaged (or open) position of the lock-up clutch 15) from the locking surface 18 inside the casing 12. Moreover, the locking piston 34 is axially displaceable away from (the engaged (or locked) position of the lock-up clutch 15) and toward (the disengaged (or open) position of the lock-up clutch 15) the torsional vibration damper 16.

Specifically, extending axially at a radially inner peripheral end $34_2$ of the locking piston 34 is a substantially cylindrical flange 36 that is proximate to and coaxial with the rotational axis X, as best shown in FIGS. 2 and 3. The cylindrical flange 36 of the locking piston 34 is mounted to the driven shaft 2b so as to be centered, rotatable and axially slidably displaceable relative to the driven shaft 2b. The sealing member (e.g., the sealing ring) 37 creates a seal at the interface of the cylindrical flange 36 and the driven shaft 2b. As discussed in further detail below, the locking piston 34 is axially movably relative to the driven shaft 2b along this interface. The axial motion of the locking piston 34 along the driven shaft 2b is controlled by torus and damper pressure chambers $23_1$, $23_2$ positioned on axially opposite sides of the locking piston 34.

The locking piston 34 is selectively pressed against the locking surface 18 of the casing 12 so as to lock-up the torque-coupling device 10 between the driving shaft 2a and the driven shaft 2b to control sliding movement between the turbine wheel 22 and the impeller wheel 20. Specifically, when an appropriate hydraulic pressure in applied to the locking piston 34, the locking piston 34 moves rightward (as shown in FIG. 2) toward the locking surface 18 of the casing 12 and away from the turbine wheel 22, and clamps the friction liner 35 between itself and the locking surface 18 of the casing 12. As a result, the lock-up clutch 15 in the locked position is mechanically frictionally coupled to the casing 12 so as to bypass the turbine wheel 22 when in the locked position of the lock-up clutch 15. Thus, the lock-up clutch 15 is provided to bypass the turbine wheel 22 when in the locked position thereof.

During operation, when the lock-up clutch 15 is in the disengaged (open) position, the engine torque is transmitted from the impeller wheel 20 by the turbine wheel 22 of the torque converter 14 to the driven shaft 2b. When the lock-up clutch 15 is in the engaged (locked) position, the engine torque is transmitted by the casing 12 to the driven shaft 2b through the torsional vibration damper 16.

The torsional vibration damper 16 advantageously allows the turbine wheel 22 of the torque converter 14 to be coupled, with torque damping, to the driven shaft 2b, i.e., the input shaft of the automatic transmission. The torsional vibration damper 16 also allows damping of stresses between the driving shaft 2a and the driven shaft 2b that are coaxial with the rotational axis X, with torsion damping.

The torque transmitting device 16, as best shown in FIG. 2, is disposed axially between the turbine shell 28 of the turbine assembly 22, and the locking piston 34 of the lock-up clutch 15. The locking piston 34 of the lock-up clutch 15 is rotatably and axially slidably mounted to the driven shaft 2b. The torsional vibration damper 16 is positioned on the driven shaft 2b in a limited, movable and centered manner. The locking piston 34 forms an input part of the torsional vibration damper 16.

The torsional vibration damper 16 comprises a torque input member 40 rotatable about the rotational axis X, and an integral radially elastic output member 42 elastically coupled to and configured to pivot (i.e., rotate) relative to the torque input member 40 around the rotational axis X.

Figure 4:
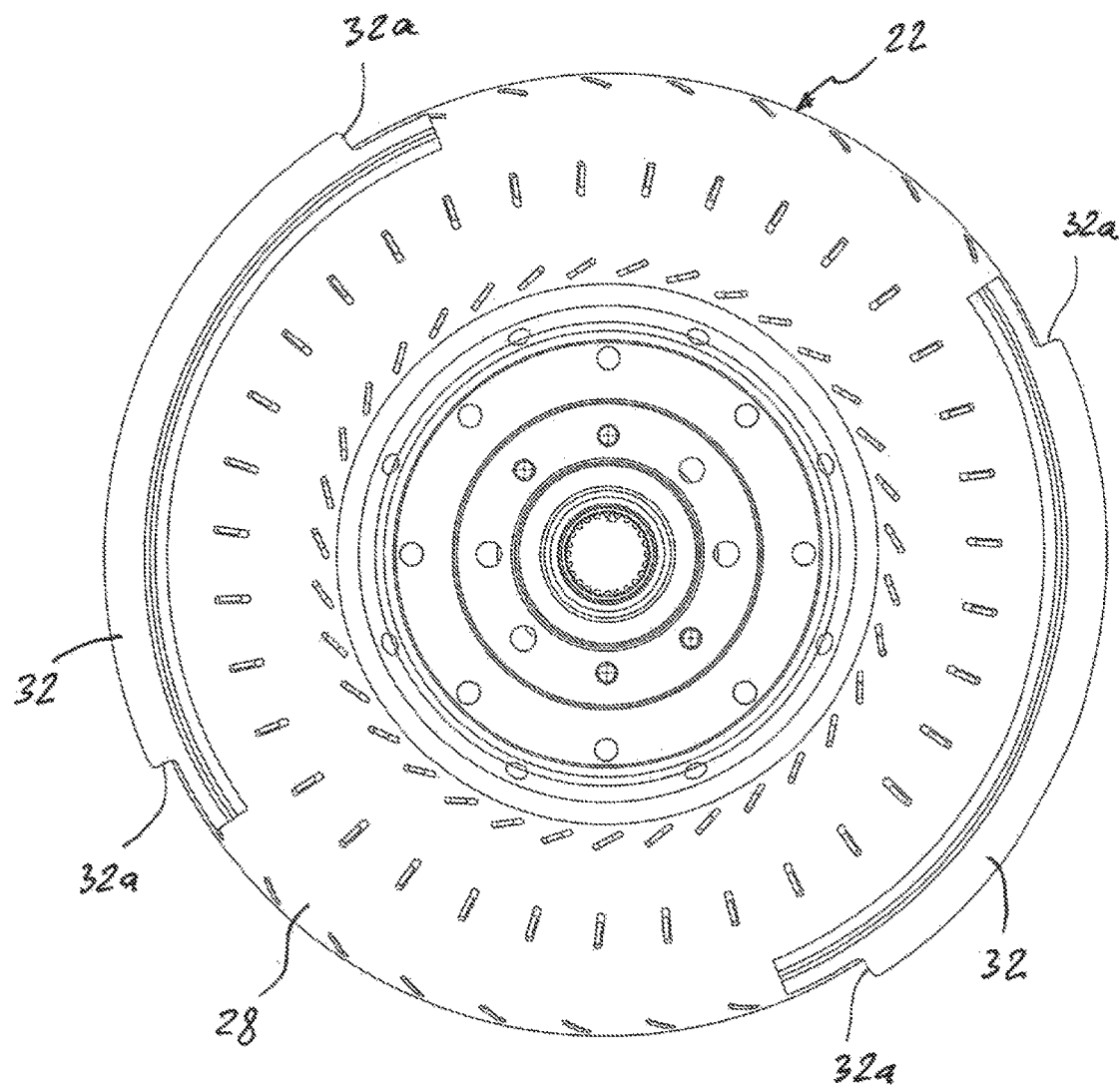
FIG. 4 is a rear view of a turbine wheel of the torque-coupling device in accordance with the first exemplary embodiment of the present invention.

The torque input member 40 includes an annular, radially oriented first retainer plate 46, and at least one and preferably two radially oriented second retainer plates 48. The annular first retainer plate 46 is substantially parallel to and axially spaced from each of the second retainer plates 48, as best shown in FIGS. 3 and 6. Moreover, each of the second retainer plates 48 is non-movably attached (i.e., fixed) to the annular first retainer plate 46, such as by welding, adhesive bonding or fasteners, such as bolts 47, as best shown in FIG. 6. Also, the second retainer plates 48 are radially opposite to one another, as best shown in FIG. 4. As further illustrated in FIGS. 5 and 6, the first retainer plate 46 is fixed to the locking piston 34 of the lock-up clutch 15 by appropriate means, such as by welding, adhesive bonding or fasteners, such as rivets 73. Accordingly, the torque input member 40 is axially movable along the rotational axis X relative to the turbine assembly 22 and the turbine assembly 22. Moreover, the torque input member 40 is rotatable relative to the turbine wheel 22 about the rotational axis X.

The torque input member 40 further includes at least one, preferably two supporting members 50. In the exemplary embodiment, the supporting members 50 are in the form of annular rolling bodies, such as cylindrical rollers rotatably mounted to a radially external periphery of the first retainer plate 46 and the second retainer plates 48, axially between the first and second retainer plates 46 and 48, respectively. Each of the rolling bodies 50 is rotatable around a central axis C thereof. The central axis C of the rolling body 50 is substantially parallel to the rotational axis X, as best shown in FIG. 2.

The rolling bodies 50 are positioned so as to be diametrically opposite to one another. More specifically, the rolling bodies 50 are rotatably mounted about hollow shafts 52, which axially extend between the first and second retainer plates 46 and 48. The hollow shafts 52 are mounted on support pins 54 extending axially through the hollow shafts 52 and between the first and second retainer plates 46 and 48, as best shown in FIGS. 3 and 6. The rolling bodies 50 are non-rotatably mounted on the hollow shafts 52 through rolling bearings, such as needle bearings 53, for instance, as best shown in FIG. 3. In other words, the rolling bodies 50 are rotatable around the central axes C, while the support pins 54 are non-movable relative to the first retainer plate 46 and the second retainer plates 48 of the torque input member 40.

Figure 5:
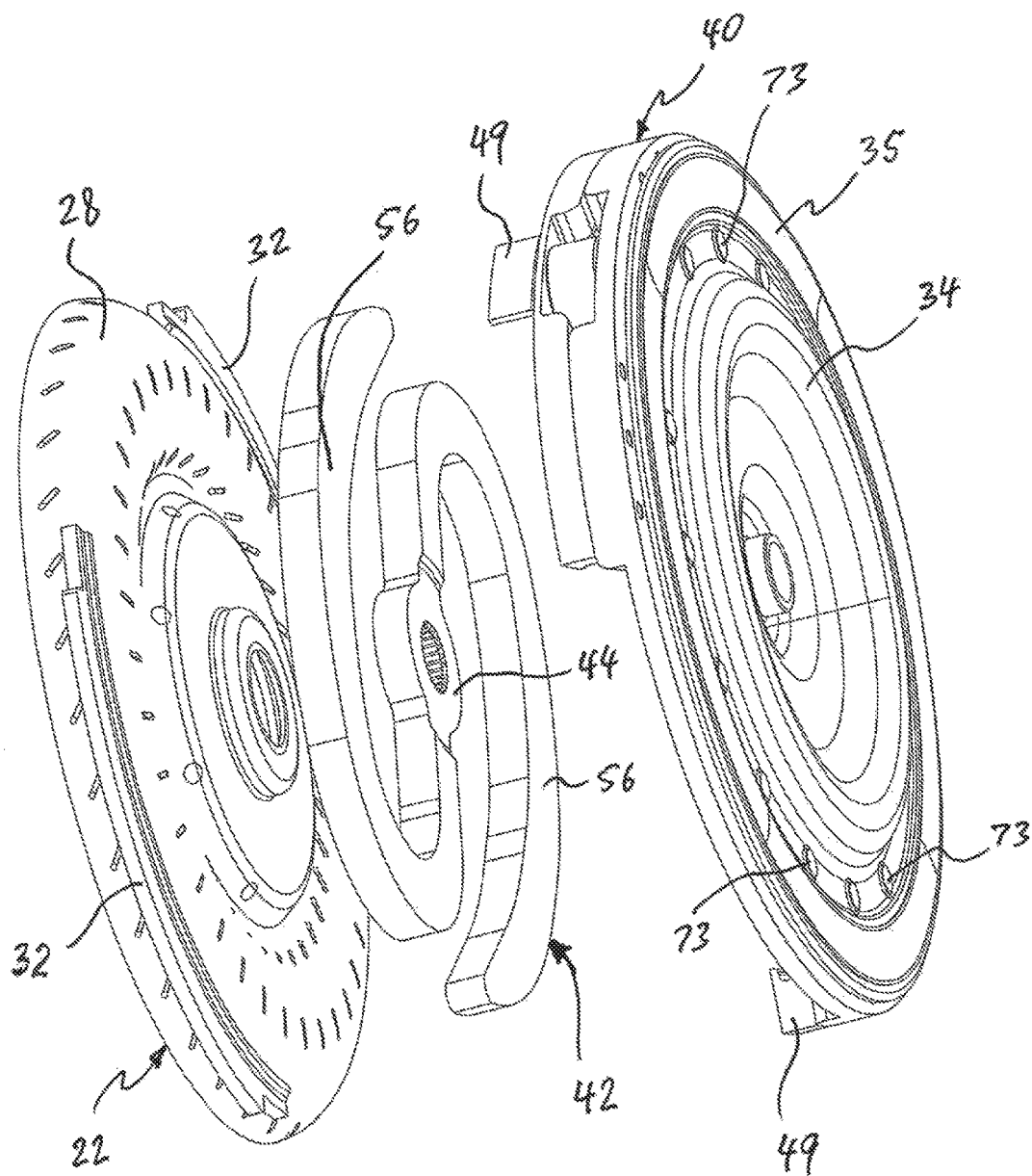
FIG. 5 is an exploded perspective view of the torsional vibration damper in accordance with the first exemplary embodiment of the present invention.
Figure 6:
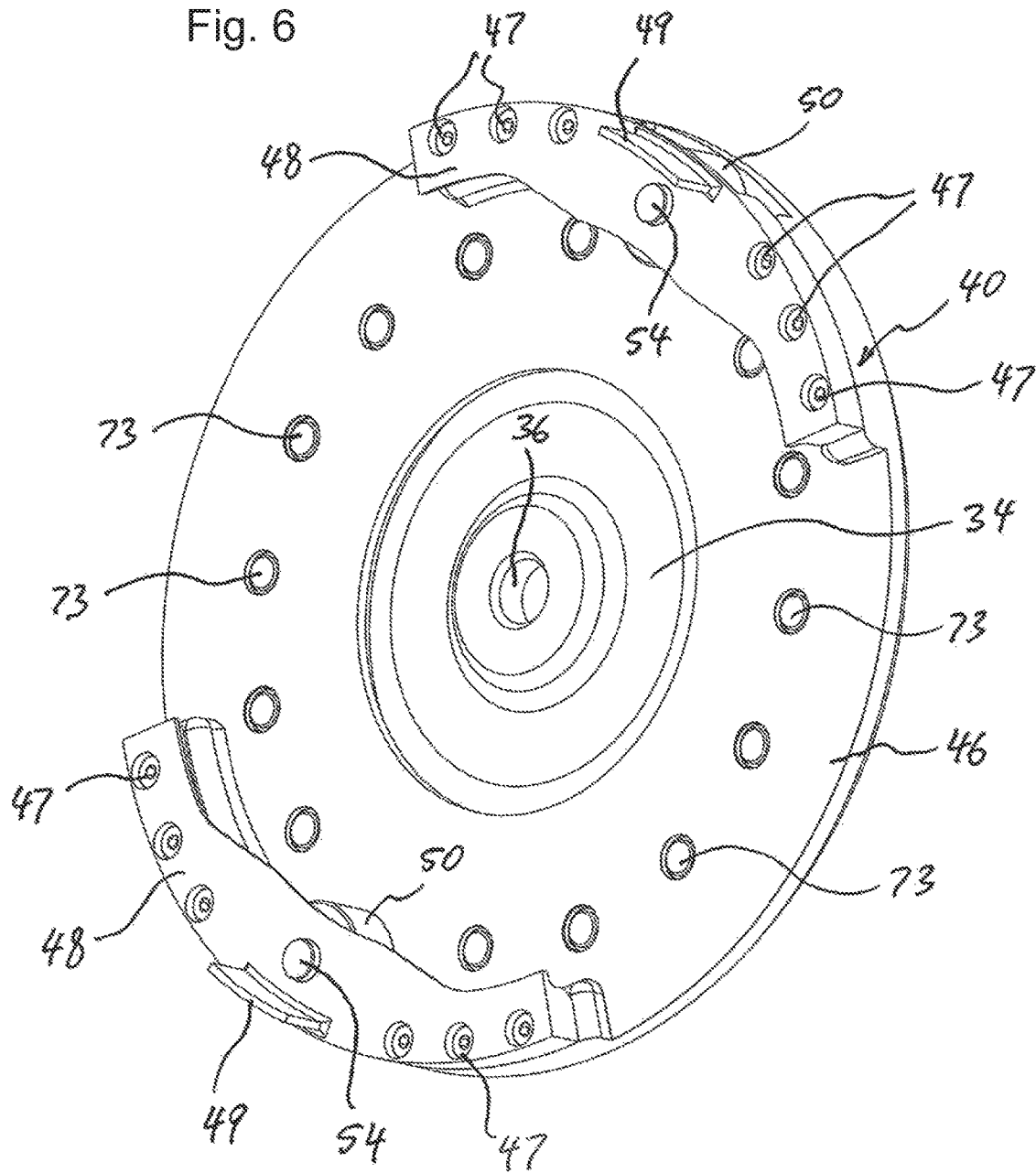
FIG. 6 is a partial perspective view of the torsional vibration damper showing a torque input member in accordance with the first exemplary embodiment of the present invention.

As best shown in FIGS. 3-5, at least one and preferably two diametrically opposite stop members 32 are affixed (i.e., non-movably attached) to an outer surface of the turbine shell 28 facing the torque input member 40 of the leaf damper 16, such as by annular welds 33 and/or fasteners. The stop members 32 are provided for angularly limiting the rotational movement of the torque input member 40 of the leaf damper 16 relative to the turbine shell 28. Each of the stop members 32 has two angularly (i.e., circumferentially) opposite rotation-limiting stop edges 32a, best shown in FIG. 4. Moreover, as further shown in FIG. 4, the stop edges 32a of the consecutive stop members 32 are angularly spaced from each other. In turn, each of the second retainer plates 48 has a connection member 49 formed integrally therewith and extending axially therefrom in the direction toward the turbine shell 28 and between the stop members 32, as best shown in FIGS. 3, 5 and 6. Moreover, each of the connection members 49 is configured to drivingly engage the stop edges 32a of the consecutive stop members 32 so as to angularly limit the rotational movement of the torque input member 40 of the leaf damper 16 relative to the turbine shell 28. The angle of rotation of the torque input member 40 relative to the turbine wheel 22 about the rotational axis X is determined by the relative angular positions of the stop edges 32a of the consecutive stop members 32. According to the exemplary embodiment, a maximum angle of rotation of the torque input member 40 relative to the turbine wheel 22 about the rotational axis X is approximately 40° to about 180°.

In operation, each of the connection members 49 of the torque input member 40 engages one of the stop edges 32a of the consecutive stop members 32, so as to limit relative rotation between the torque input member 40 and the turbine wheel 22 when the torque input member 40 and the turbine wheel 22 rotate relative to one another in both clockwise and counterclockwise directions of rotation. At the same time, the drive connection members 49 of the torque input member 40 of the torsional vibration damper 16 are axially movable relative to the stop members 32 of the turbine shell 28. Accordingly, the torque input member 40 and the locking piston 34 are non-rotatably coupled to and axially movable relative to the turbine-piston shell 28.

Figure 7:
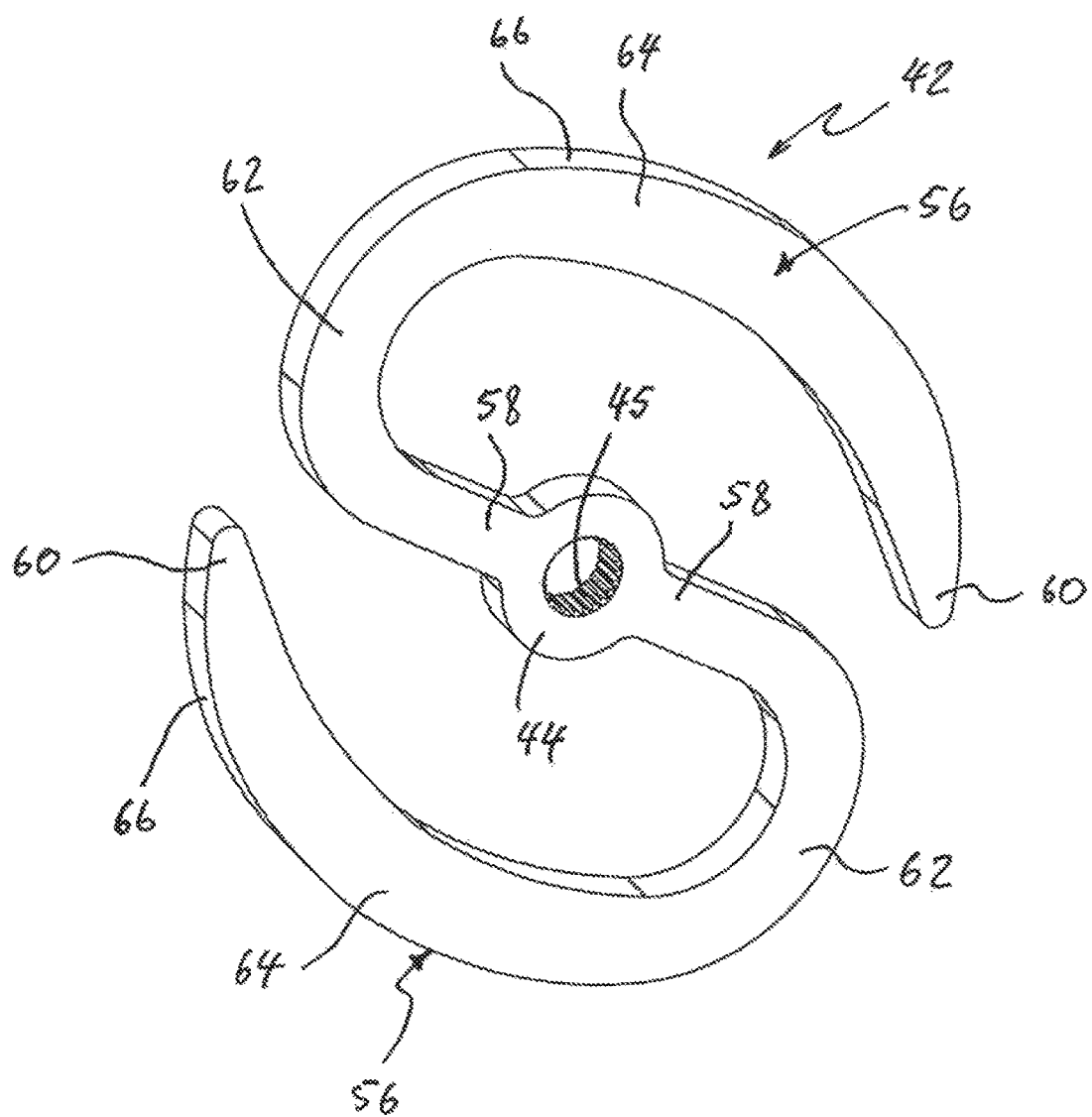
FIG. 7 is a perspective view of a radially elastic output member of the torsional vibration damper in accordance with the first exemplary embodiment of the present invention.

The radially elastic output member 42 includes an annular output hub 44 coaxial with the rotational axis X and rotatable relative the torque input member 40, and at least one and preferably two substantially identical, radially opposite curved elastic leaves (or blades) 56 integral with the output hub 44, as best shown in FIG. 7. The radially elastic output member 42 is made of steel by fine stamping and necessary heat treatment.

The radially elastic output member 42 is configured to be elastically and radially supported by the rolling bodies 50 and to elastically bend in the radial direction upon rotation of the torque input member 40 with respect to the radially elastic output member 42. A radially inner surface of the output hub 44 includes splines 45 for directly and non-rotatably engaging complementary splines 2c of the driven shaft 2b. At the same time, the output hub 44 of the radially elastic output member 42 is axially movable relative to the driven shaft 2b due to a splined connection therebetween. Accordingly, the radially elastic output member 42 is non-rotatably coupled to and axially movable relative to the driven shaft 2b. Moreover, the output hub 44 is non-movably attached (i.e., fixed) to the turbine shell 28, such as by weld 29 or by fasteners.

As best shown in FIG. 7, each of the curved elastic leaves 56 is symmetrical with respect to the rotational axis X. Moreover, each of the curved elastic leaves 56 has a proximal end 58 non-movably connected (i.e., fixed) to the output hub 44, a free distal end 60, a bent portion 62 adjacent to the proximal end 58, and a curved raceway portion 64 disposed adjacent to free distal end 60 of the elastic leaf 56 for bearing one of the rolling bodies 50. Also, the curved raceway portion 64 is connected to the output hub 44 by the bent portion 62. The output member 42 with the output hub 44 and the elastic leaves 56 is an integral (or unitary) component, e.g., made of a single part, but may be separate components fixedly connected together.

Each of the curved elastic leaves 56 and each of the bent portions 64 are elastically deformable. The bent portion 62 has an angle of approximately 180°. A radially external surface of the curved raceway portion 64 of each of the curved elastic leaves 56 defines a radially outer raceway 66 configured as a surface that is in a rolling contact with one of the rollers 50, so that each of the rolling bodies 50 is positioned radially outside of the elastic leaf 56, as illustrated in FIGS. 2 and 3. The raceways 66 of the curved raceway portions 64 of the curved elastic leaf 56 extend on a circumference with an angle ranging from about 90° to about 180°. The raceways 66 of each of the curved raceway portions 64 has a generally convex shape, as best shown in FIG. 7. Moreover, as the torque input member 40 is axially movable along the rotational axis X relative to the turbine assembly 22 and the turbine assembly 22, the rolling bodies 50 are axially displaceable relative to the raceways 66 of the curved raceway portions 64 of the curved elastic leaves 56.

The lock-up clutch 15 is configured to non-rotatably couple the casing 12 and the torque input member 40 in the engaged (locked) position, and configured to drivingly disengage the casing 12 and the torque input member 40 in the disengaged (open) position.

In operation, when a rolling body 50 moves along a raceway 66 of a curved raceway portion 64 of a curved elastic leaf 56, the rolling body 50 presses the curved raceway portion 64 of the curved elastic leaf 56 radially inwardly, thus enabling contact of the rolling body 50 with the curved raceway portion 64 of the curved elastic leaf 56, as illustrated in FIG. 3. Radial forces make it possible for the curved elastic leaf 56 to bend, and forces tangential to a raceway 66 of a curved elastic leaf 56 make it possible for the rolling body 50 to move (roll) on the raceway 66 of the curved elastic leaf 56, and to transmit torque from the torque input member 40 to the output hub 44 of the elastic output member 42, and then to the driven shaft 2*b*. Thus, the output hub 44 of the radially elastic output member 42, which is splined directly to the driven shaft 2*b*, forms an output part of the torsional vibration damper 16 and a driven side of the torque-coupling device 10. The locking piston 34, on the other hand, forms an input part of the torsional vibration damper 16. The torque from the driving shaft (or crankshaft) 2*a* is transmitted to the casing 12 through the flexplate 11 and studs 13.

In the disengaged position of the lock-up clutch 15, torque flows through the torque converter 14, i.e. the impeller wheel 20 and then the turbine wheel 22 fixed to the output hub 44 of the elastic output member 42. The torque is then transmitted to the driven shaft (transmission input shaft) 2*b* splined directly to the output hub 44.

In the engaged position of the lock-up clutch 15, torque from the casing 12 is transmitted to the torque input member 40 (i.e., the first retainer plate 46 and the second retainer plates 48, and the rolling bodies 50) through the elastic output member 42 formed by the output hub 44 and the elastic leaves 56. The torque is then transmitted from the output hub 44 of the elastic output member 42 to the driven shaft (transmission input shaft) 2*b* splined to the output hub 44. Moreover, when the torque transmitted between the casing 12 and the output hub 44 of the elastic output member 42 varies, the radial forces exerted between each of the elastic leaves 56 and the corresponding rolling body 50 vary and bending of the elastic leaves 56 is accordingly modified. The modification in the bending of the elastic leaf 56 comes with motion of the rolling body 50 along the corresponding raceway 66 of the curved elastic leaf 56 due to peripheral stresses.

The raceway 66 has a profile so arranged that, when the transmitted torque increases, the rolling body 50 exerts a bending force on the corresponding curved elastic leaf 56, which causes the free distal end 60 of the curved elastic leaf 56 to move radially towards the rotational axis X and produces a relative rotation between the casing 12 and the output hub 44 of the elastic output member 42, such that both the casing 12 and the output hub 44 move away from their relative rest positions. A rest position is that position of the torque input member 40 relative to the elastic output member 42, wherein no torque is transmitted between the casing 12 and the output hub 44 of the elastic output member 42 through the rolling bodies 50.

The profiles of the raceways 66 are such that the rolling bodies 50 exert bending forces (pressure) having radial and circumferential components onto the curved elastic leaves 56. Specifically, the elastic leaves 56 are configured so that in a relative angular position between the torque input member 40 and the elastic output member 42 different from the rest position, each of the rolling bodies 50 exerts a bending force on the corresponding elastic leaf 56, thus causing a reaction force of the elastic leaf 56 acting on the rolling body 50, with the reaction force having a radial component which tends to maintain the elastic leaf 56 in contact with the rolling body 50.

In turn, each of the elastic leaves 56 exerts onto the corresponding rolling body 50 a back-moving force having a circumferential component which tends to rotate the rolling bodies 50 in a reverse direction of rotation, and thus to move the torque input member 40 (thus, the turbine wheel 22) and the output hub 44 of the elastic output member 42 back towards their relative rest positions, and a radial component directed radially outwardly, which tends to maintain each of the raceways 66 in direct contact with the corresponding rolling body 50.

When the casing 12 and the elastic output member 42 are in the rest position, the elastic leaves 56 are preferably radially pre-stressed toward the rotational axis X so as to exert a reaction force directed radially outwards, to thus maintain the curved elastic leaves 56 supported by the associated rolling bodies 50.

Moreover, the profiles of the raceways 66 are so arranged that a characteristic transmission curve of the torque according to the angular displacement of the rolling body 50 relative to the raceway 66 is symmetrical or asymmetrical relative to the rest position. According to the exemplary embodiment, the angular displacement of the rolling body 50 relative to the raceway 66 is more important in a direct direction of rotation than in a reverse (i.e., opposite to the direct) direction of rotation.

According to the exemplary embodiment, the angular displacement of the casing 12 relative to the elastic output member 42 in the locked position of the lock-up clutch 15 is greater than 20°, preferably greater than 40°. The curved elastic leaves 56 are regularly distributed around the rotational axis X and are symmetrical relative to the rotational axis X so as to ensure the balance of the torque converter 14.

A method for assembling the hydrokinetic torque-coupling device 10 is as follows. It should be understood that this exemplary method may be practiced in connection with the other embodiments described herein. This exemplary method is not the exclusive method for assembling the turbine assembly described herein. While the methods for assembling the hydrokinetic torque-coupling device 10 may be practiced by sequentially performing the steps as set forth below, it should be understood that the methods may involve performing the steps in different sequences.

A method for assembling the hydrokinetic torque-coupling device 10 is as follows. First, the impeller wheel 20, the turbine wheel 22, the stator 24, and the leaf damper 16 may each be preassembled. The impeller wheel 20 and the turbine wheel 22 are formed by stamping from steel blanks or by injection molding of a polymeric material. The stator 24 is made by casting from aluminum or injection molding of a polymeric material. The impeller wheel 20, the turbine wheel 22 and the stator 24 subassemblies are assembled together so as to form the torque converter 14. The leaf damper 16 is then added. Before the leaf damper 16 is assembled, the locking piston 34 of the lock-up clutch 15 is fixed to the first retainer plate 46 of the torque input member 40 by appropriate means, such as by welding, adhesive bonding or fasteners, such as the rivets 73.

Next, the turbine shell 28 of the turbine wheel 22 is non-movably (i.e., fixedly) secured to the output hub 44 of the elastic output member 42 of the leaf damper 16. Then, the first shell 17 is non-movably and sealingly secured, such as by welding at 19, to the second casing shell 18, as best shown in FIG. 2. After that, the torque-coupling device 10 is mounted to the driven shaft 2*b* (i.e., the input shaft of the automatic transmission of the motor vehicle) so that the output hub 44 of the elastic output member 42 of the leaf damper 16 is splined directly to the transmission input shaft 2b and the cylindrical flange 36 of the locking piston 34 is slidably mounted over the transmission input shaft 2b.

Various modifications, changes, and alterations may be practiced with the above-described embodiment, including but not limited to the additional embodiments shown in FIGS. 8-26. In the interest of brevity, reference characters in FIGS. 8-26 that are discussed above in connection with Figs. FIGS. 2-7 are not further elaborated upon below, except to the extent necessary or useful to explain the additional embodiments of FIGS. 8-26. Modified components and parts are indicated by the addition of a hundred digits to the reference numerals of the components or parts.

In a hydrokinetic torque-coupling device 110 of a second exemplary embodiment illustrated in FIGS. 8-12, the lock-up clutch 15 and the torsional vibration damper 16 are replaced by a lock-up clutch 115 and a torsional vibration damper 116. The hydrokinetic torque-coupling device 110 of FIGS. 8-12 corresponds substantially to the hydrokinetic torque-coupling device 10 of FIGS. 2-7, and only the lock-up clutch 115 and the torsional vibration damper 116, which principally differ, will therefore be explained in detail below.

Figure 9:
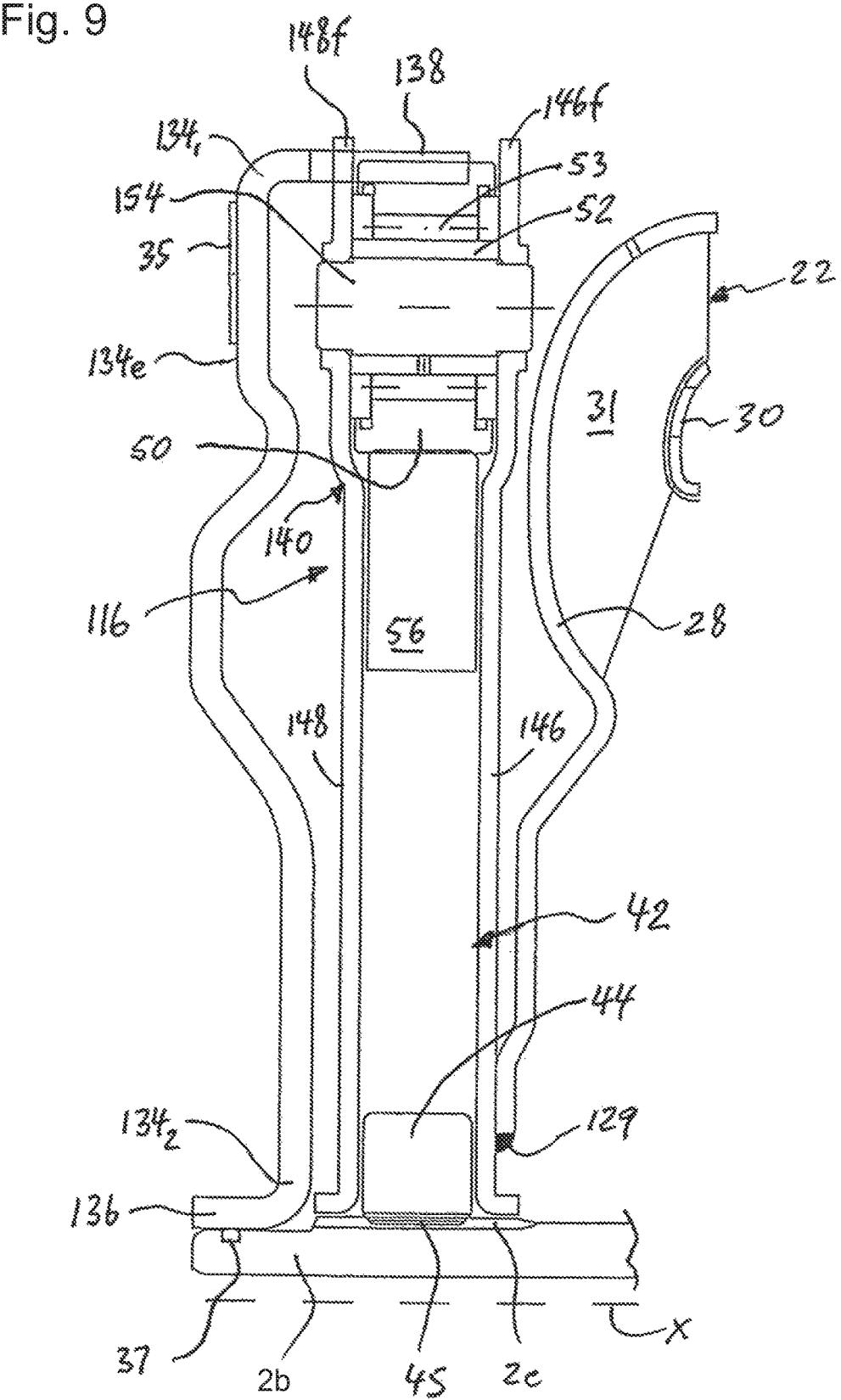
FIG. 9 is a fragmented partial half-view in axial section of the hydrokinetic torque-coupling device showing a lock-up clutch and the torsional vibration damper in accordance with the second exemplary embodiment of the present invention.
Figure 10:
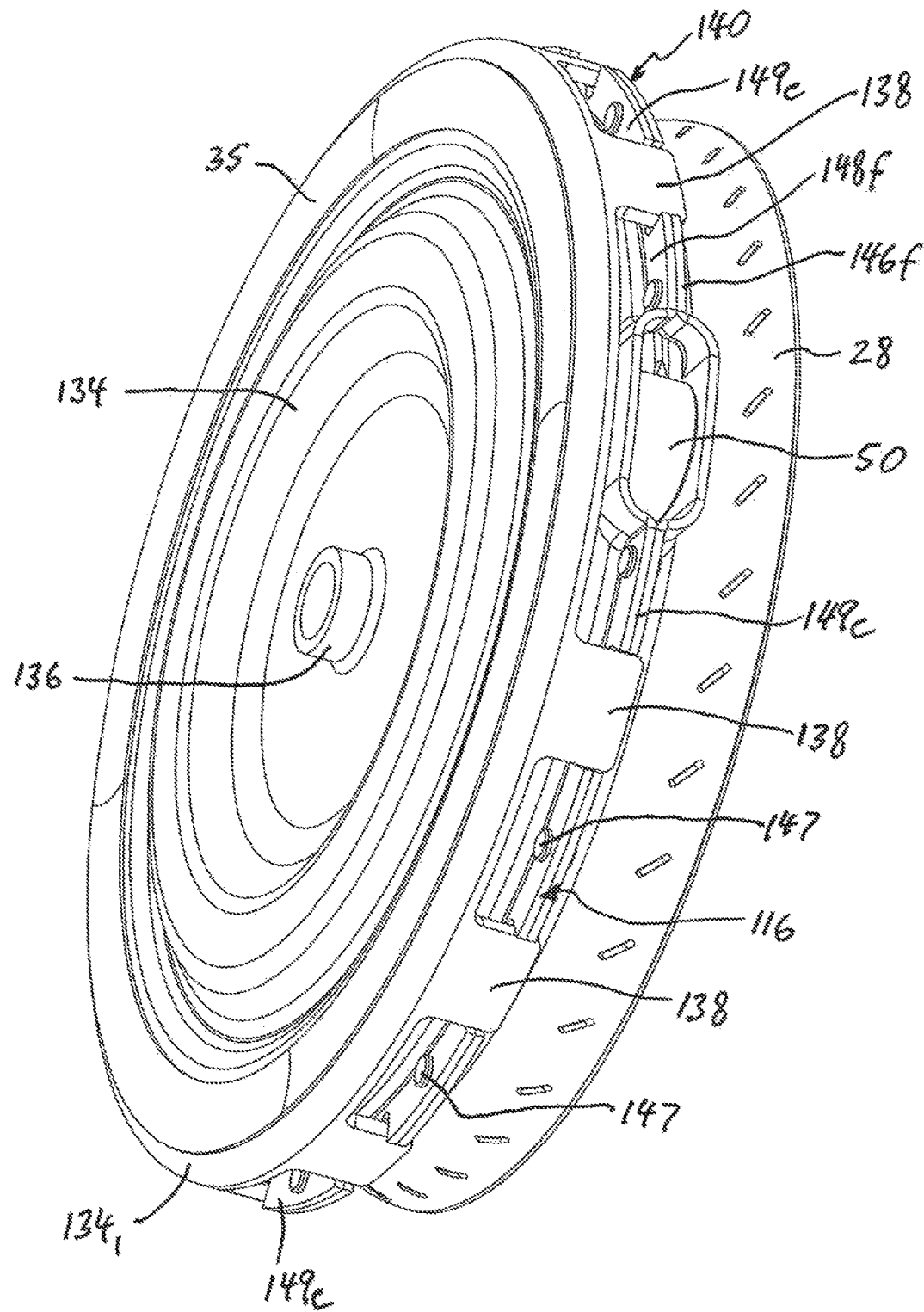
FIG. 10 is a perspective view of the torsional vibration damper and the lock-up clutch in accordance with the second exemplary embodiment of the present invention.

The lock-up clutch 115 includes a substantially annular locking piston 134 having an engagement surface 134e facing a locking surface 18 defined on the first casing shell $17_1$ of the casing 12. The locking piston 134 is axially movable along the rotational axis X to and from the locking surface 18 so as to selectively engage the locking piston 134 against the locking surface 18 of the casing 12. The lock-up clutch 115 further includes an annular friction liner 35 fixedly attached to the engagement surface 134e of the locking piston 134 by any appropriate means known in the art, such as by adhesive bonding. As best shown in FIGS. 9 and 10, the friction liner 35 is fixedly attached to the engagement surface 134e of the locking piston 134 at a radially outer peripheral end $134_1$ thereof.

Figure 8:
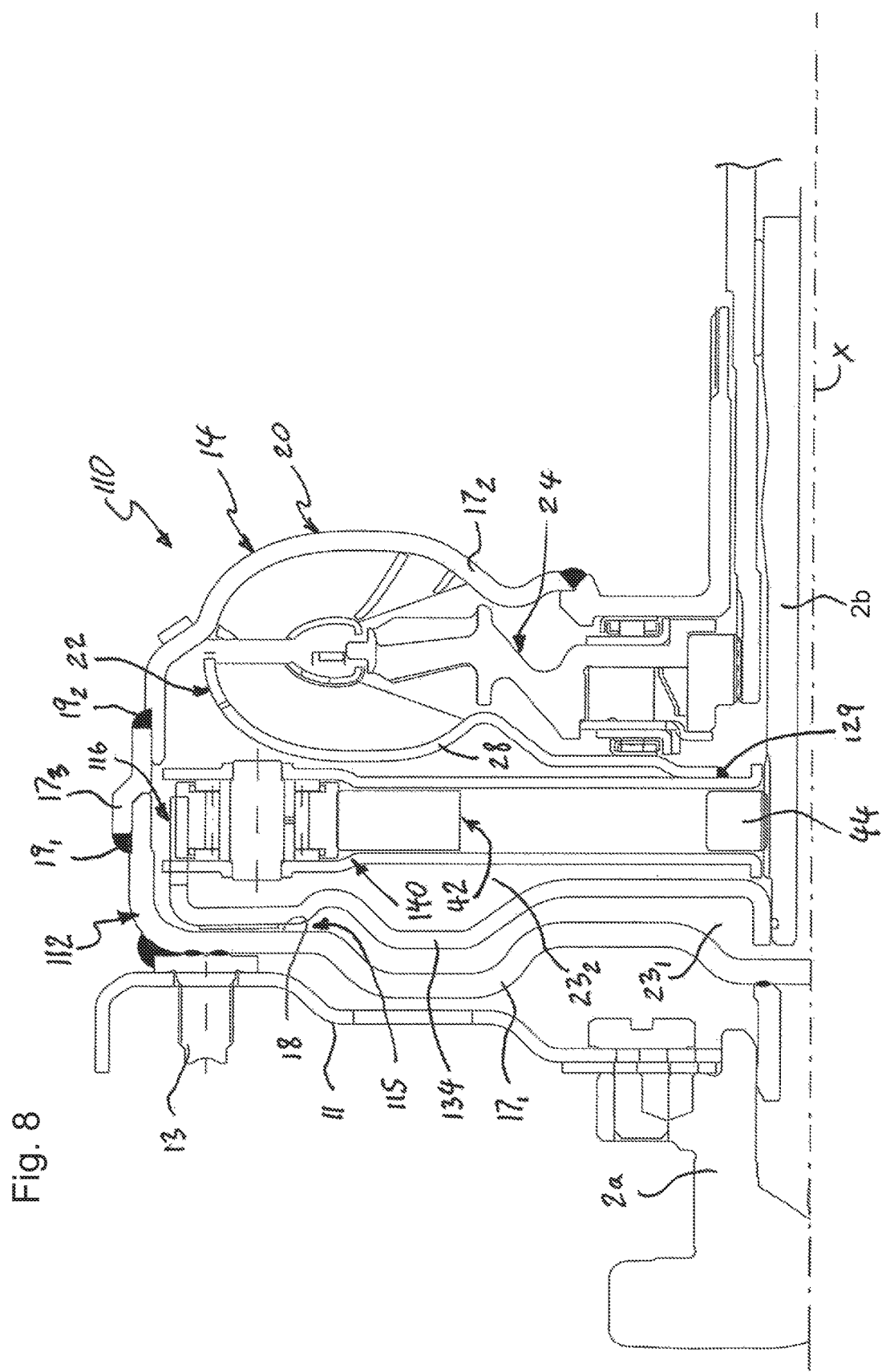
FIG. 8 is a fragmented half-view in axial section of a hydrokinetic torque-coupling device with a torsional vibration damper in accordance with a second exemplary embodiment of the present invention.
Figure 12:
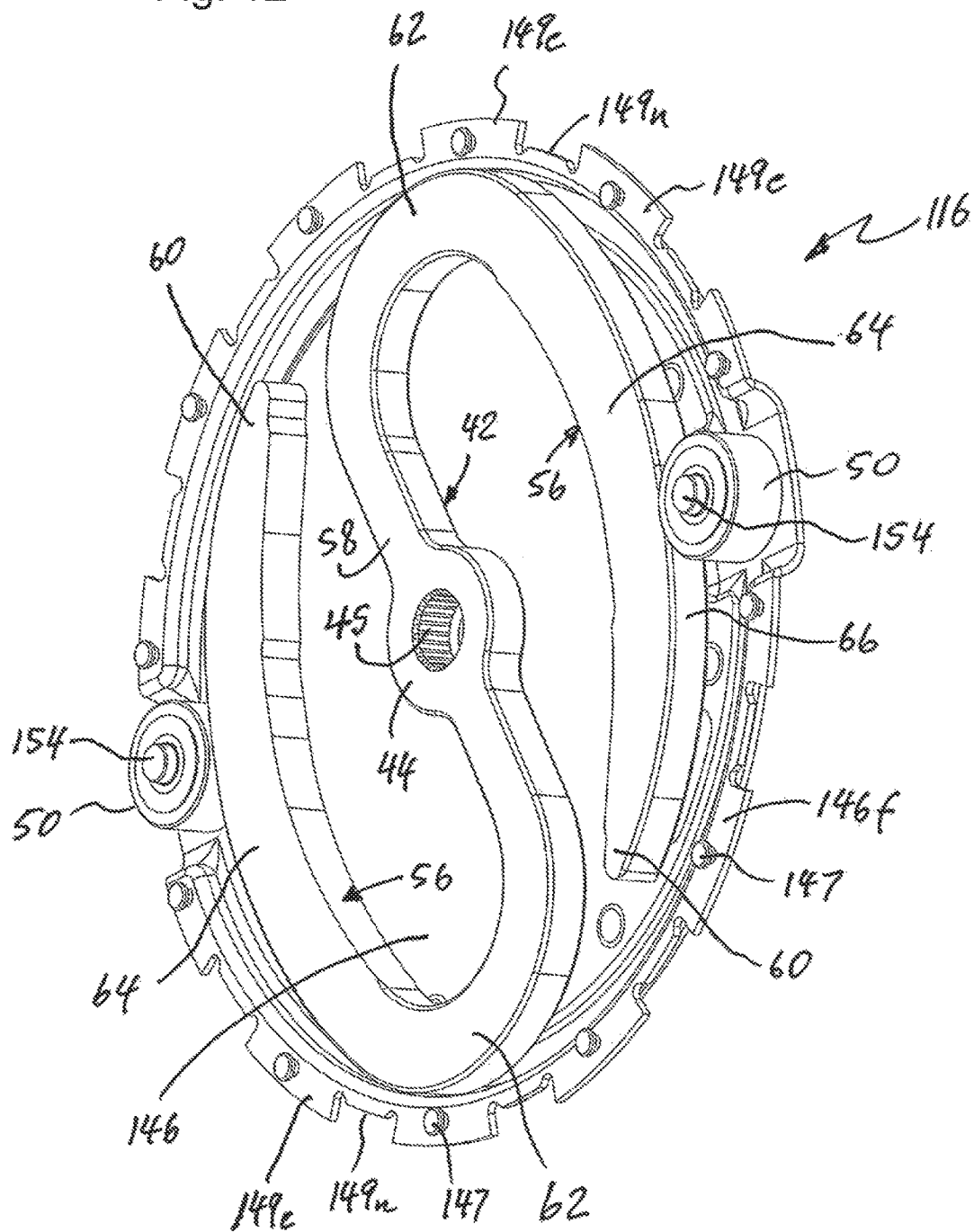
FIG. 12 is a partial perspective view of the torque input member and a radially elastic output member of the torsional vibration damper in accordance with the second exemplary embodiment of the present invention.

The torsional vibration damper 116, as best shown in FIGS. 8-10, is interposed axially between the turbine shell 28 and the locking piston 134. The torsional vibration damper 116 comprises a torque input member 140 rotatable about the rotational axis X, and an integral radially elastic output member 42 elastically coupled to and rotatable relative to the torque input member 140 around the rotational axis X, as best shown in FIGS. 9 and 12.

Figure 11:
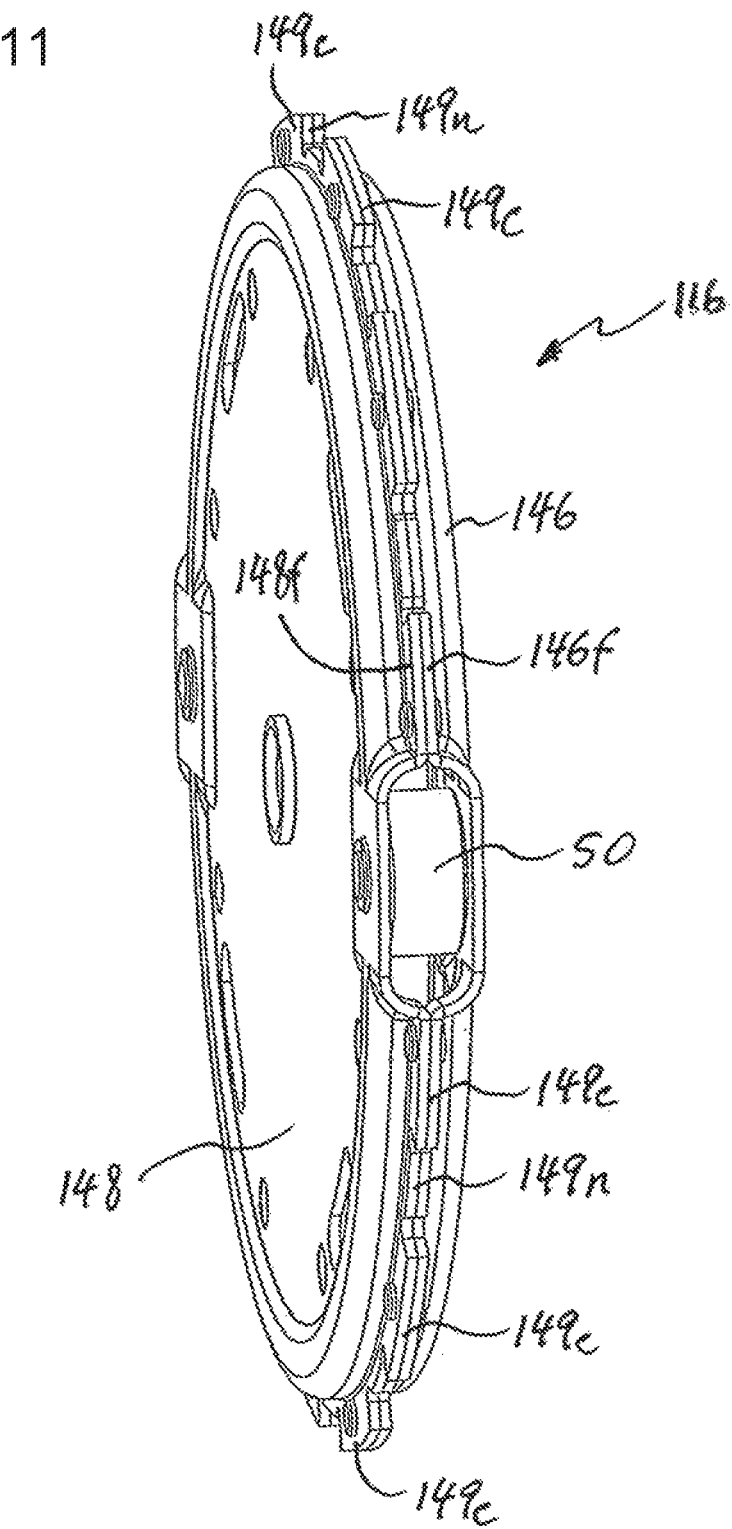
FIG. 11 is a perspective view of a torque input member of the torsional vibration damper in accordance with the second exemplary embodiment of the present invention.

The torque input member 140 includes two axially opposite annular, radially oriented retainer plates, including a first annular, radially oriented retainer plate 146 adjacent to the turbine shell 28, and a second annular, radially oriented retainer plate 148 adjacent to the locking piston 134. The first retainer plate 146 is substantially parallel to and axially spaced from the second retainer plate 148, as best shown in FIG. 9. Moreover, the first and second retainer plates 146 and 148, respectively, are non-movably attached (i.e., fixed) to one another, such as by fasteners 147. Also, the first retainer plate 146 is substantially identical to the second retainer plate 148, as best shown in FIGS. 9 and 11.

According to the second exemplary embodiment of the present invention as best illustrated in FIGS. 8-12, the first retainer plate 146 has a substantially annular outer mounting flange 146f provided with a plurality of circumferentially spaced holes. The second retainer plate 148, on the other hand, has a substantially annular outer mounting flange 148f provided with a plurality of circumferentially spaced holes. The first and second retainer plates 146 and 148 are non-movably (i.e., fixedly) secured to one another so that the outer mounting flanges 146f, 148f of the first and second retainer plates 146, 148 axially engage one another and are fixed by rivets 147 extending through the holes in the outer mounting flanges 146f, 148f of the first and second damper retainer plates 146, 148, as best shown in FIGS. 8-11. Thus, the first and second retainer plates 146, 148 are non-rotatable relative to one another, but rotatable relative to the radially elastic output member 42.

As further illustrated in FIGS. 8-10, the first retainer plate 146 is non-rotatably coupled to the locking piston 134 of the lock-up clutch 115. The first and second retainer plates 146, 148 are arranged axially on either side of the elastic output member 42 and are operatively connected therewith. The first and second retainer plates 146, 148 are non-movably (i.e., fixedly) secured to one another by any appropriate means, such as by fasteners so as to rotatable relative to the elastic output member 42. Moreover, the first retainer plate 146 is non-movably attached (i.e., fixed) to the turbine shell 28, such as by weld 129 or by fasteners.

The torque input member 140 further includes at least one, preferably two supporting members 50. In the exemplary embodiment, the supporting members 50 are in the form of annular rolling bodies, such as cylindrical rollers rotatably mounted to a radially external periphery of the first retainer plate 46 and the second retainer plates 48, axially between the first and second retainer plates 46 and 48, respectively. Each of the rolling bodies 50 is rotatable around a central axis C thereof.

The rolling bodies 50 are positioned so as to be diametrically opposite to one another. More specifically, the rolling bodies 50 are rotatably mounted about hollow shafts 52, which axially extend between the first and second retainer plates 146 and 148. The hollow shafts 52 are mounted on the first and second retainer plates 146 and 148 through support pins 154 extending through the hollow shafts 52 and the first and second retainer plates 146 and 148, as best shown in FIG. 9. Also, the support pins 154 non-movably secure the second retainer plate 148 to the first retainer plate 146. Alternatively, other fasteners, such as screws or bolts may be used. The rolling bodies 50 are rotatably mounted on the hollow shafts 52 through rolling bearings, such as needle bearings 53, for instance, best shown in FIG. 9.

The lock-up clutch 115 is configured to non-rotatably couple the casing 12 and the torque input member 140 in the engaged (locked) position, and configured to drivingly disengage the casing 12 and the torque input member 140 in the disengaged (open) position.

The locking piston 134 further comprises at least one, preferably a plurality of coupling lugs 138 axially extending from a radially outer peripheral end $134_1$ thereof toward the torque input member 140 and the turbine shell 28. The locking piston 134 with the axially extending coupling lugs 138 is preferably an integral part, e.g., made of a single or unitary (i.e., made as a single part) component, but may be made of separate components fixedly connected together. The torque input member 140, on the other hand, includes at least one, and preferably a plurality of notches (or recesses) 149n each complementary to one of the coupling lugs 138. Specifically, the notches 149n are provided in the outer mounting flanges 146f, 148f of the first and second retainer plates 146, 148, as best shown in FIGS. 8 and 9. The notches 149n are separated from each other by radially outwardly extending cogs (or teeth) 149c.

Each of the coupling lugs 138 positively engages one of the notches 149n so as to non-rotatably couple the locking piston 134 and the torque input member 140 while allowing axial motion of the locking piston 134 with respect to the torque input member 140, as best shown in FIGS. 8-10. According to the second exemplary embodiment of the present invention, the torque input member 140 has ten notches 149$n$, while the locking piston 134 has ten complementary coupling lugs 138.

A cylindrical flange 136 of the locking piston 134 is mounted to the driven shaft 2$b$ so as to be centered, rotatable and axially slidably displaceable relative to the driven shaft 2$b$. The locking piston 134 is also axially slidably displaceable relative to the torque input member 140 of the torsional vibration damper 116. The axial displacement of the locking piston 134 along the driven shaft 2$b$ is controlled by the pressure chambers $23_1$, $23_2$ positioned on axially opposite sides of the locking piston 134.

In operation, when the lock-up clutch 115 is in the disengaged position (non-lockup mode), the engine torque is transmitted from the impeller wheel 20 by the turbine wheel 22 of the torque converter 14 to the driven shaft 2$b$ through the torsional vibration damper 116. Specifically, the torque is transmitted from turbine wheel 22 to the first retainer plate 146 of the torque input member 140, next from the torque input member 140 to the output hub 44 of the elastic output member 42, and then from the output hub 44 directly to the driven shaft 2$b$. When the lock-up clutch 15 is in the engaged (locked) position (i.e., when the locking piston 134 is engaged (or locked) against the locking surface 18 of the casing 12 by action of the hydraulic pressure), the engine torque is transmitted by the casing 12 to the driven shaft 2$b$ also through the torsional vibration damper 116. Specifically, the engine torque is transmitted from the casing 12 to the locking piston 134, then from the locking piston 134 to the torque input member 140, next from the torque input member 140 to the output hub 44 of the elastic output member 42, and then from the output hub 44 directly to the driven shaft 2$b$.

A method for assembling the hydrokinetic torque-coupling device 110 is as follows. It should be understood that this exemplary method may be practiced in connection with the other embodiments described herein. This exemplary method is not the exclusive method for assembling the turbine assembly described herein. While the methods for assembling the hydrokinetic torque-coupling device 110 may be practiced by sequentially performing the steps as set forth below, it should be understood that the methods may involve performing the steps in different sequences.

First, the impeller wheel 20, the turbine wheel 22, the stator 24, and the damper assembly 116 may each be preassembled. The impeller wheel 20 and the turbine wheel 22 are formed by stamping from steel blanks or by injection molding of a polymeric material. The stator 24 is made by casting from aluminum or injection molding of a polymeric material. The impeller wheel 20, the turbine wheel 22 and the stator 24 subassemblies are assembled together so as to form the torque converter 14. The damper assembly 116 is then added. Next, the first retainer plate 146 of the torsional vibration damper 116 is non-movably (i.e., fixedly) secured to the turbine shell 28, such as by weld 129 or by fasteners, as illustrated in FIGS. 8 and 9.

Then, the locking piston 134 of the lock-up clutch 115 is provided as an integral part with the axially extending coupling lugs 138, made of a single or unitary (i.e., made as a single part) component, but may be made of separate components fixedly connected together. Next, the locking piston 134 is axially displaced toward the first retainer plate 146 of the torsional vibration damper 116 such that each of the coupling lugs 138 positively engages one of the notches 149$n$ of the torque input member 140 so as to non-rotatably couple the locking piston 134 and the torque input member 140 while allowing an axial motion of the locking piston 134 with respect to the torque input member 140, as best shown in FIGS. 8-10.

Next, the first shell $17_1$ is non-movably and sealingly secured, such as by welding at 19, to the second shell $17_2$, as best shown in FIG. 8. After that, the hydrokinetic torque-coupling device 110 is mounted to the transmission input shaft 2$b$ so that the output hub 44 is splined directly to the transmission input shaft 2$b$ and the cylindrical flange 136 of the locking piston 134 is slidably mounted over the transmission input shaft 2$b$.

Figure 13:
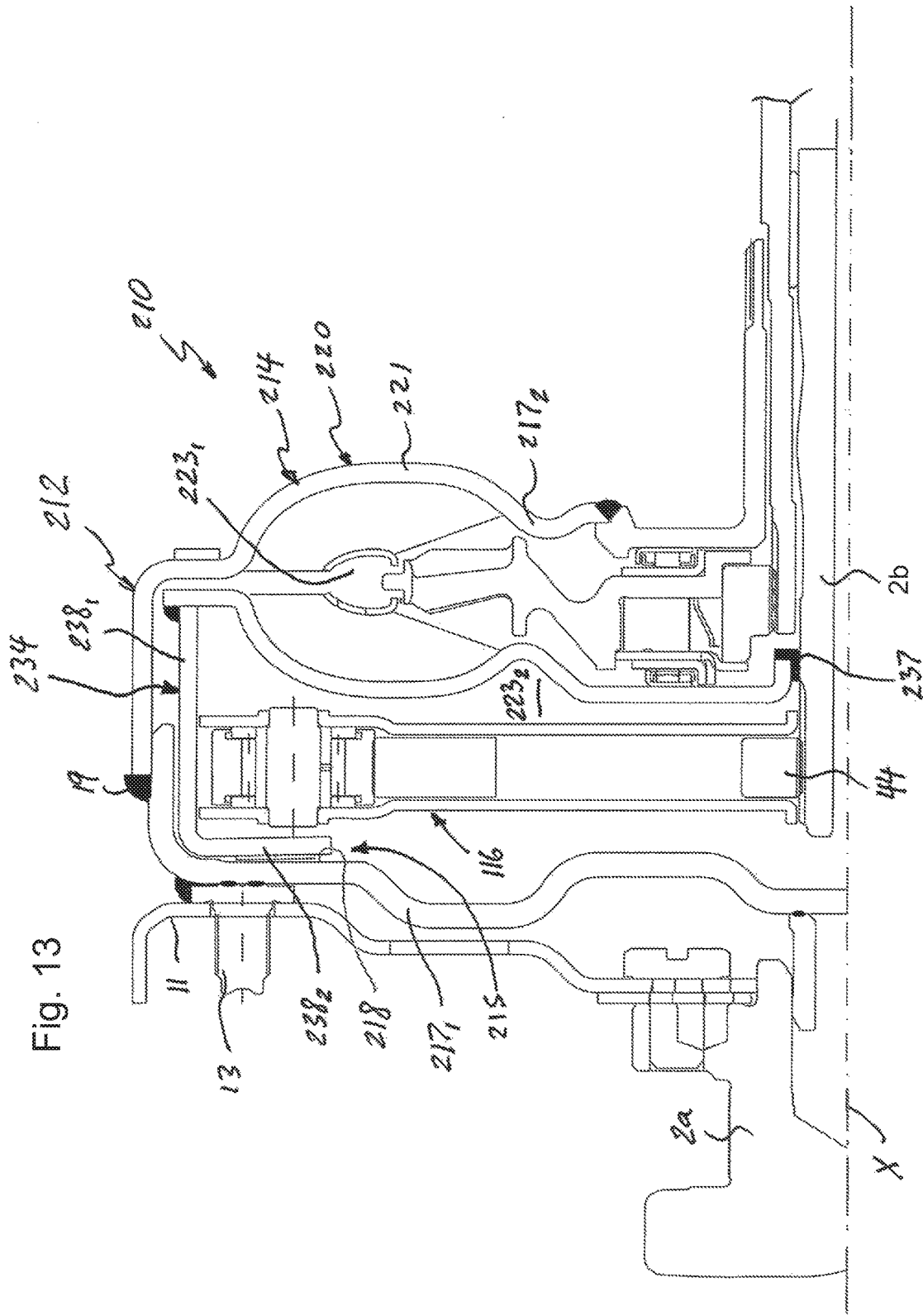
FIG. 13 is a fragmented half-view in axial section of a hydrokinetic torque-coupling device with a torsional vibration damper in accordance with a third exemplary embodiment of the present invention.
Figure 14:
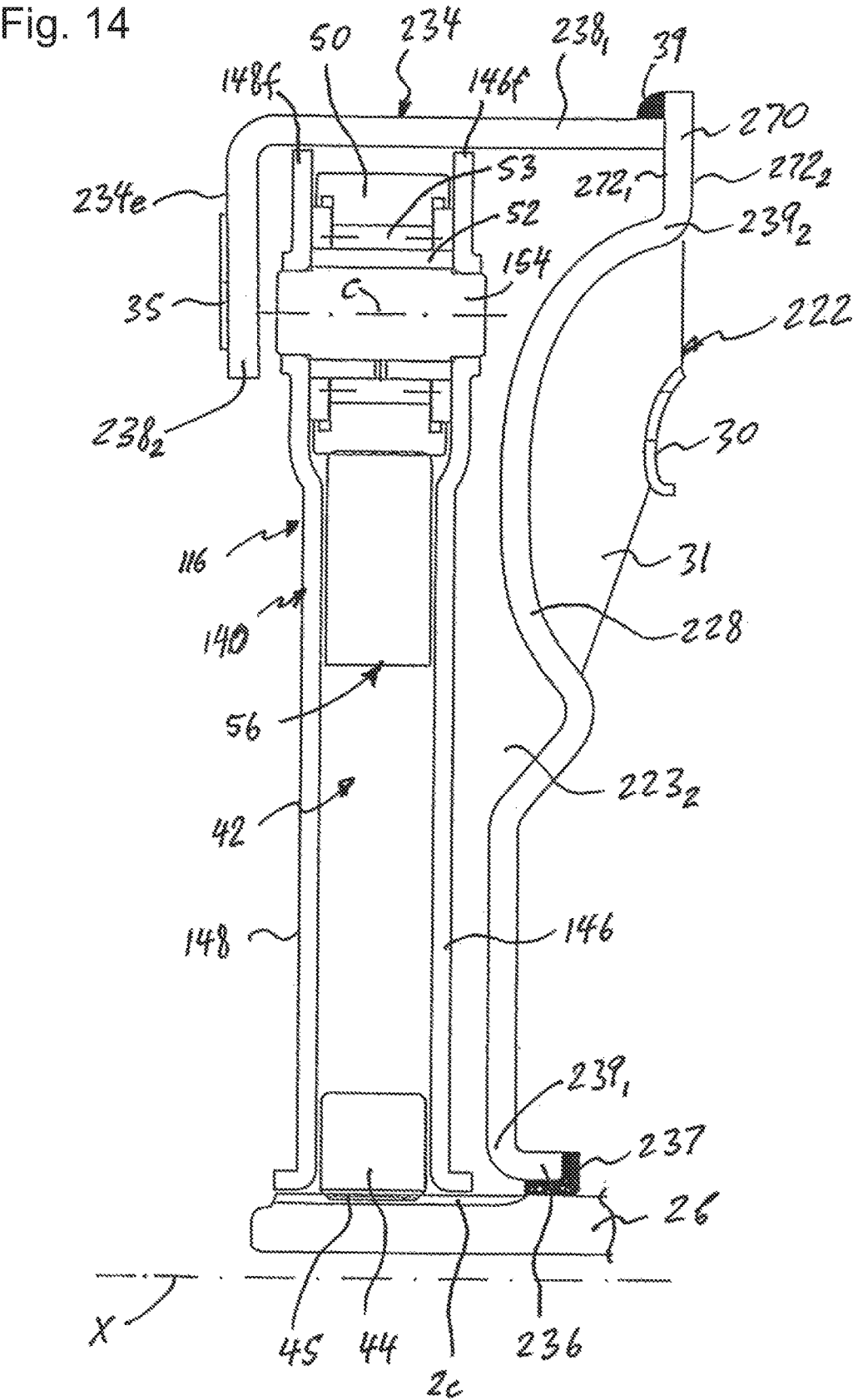
FIG. 14 is a fragmented partial half-view in axial section of the hydrokinetic torque-coupling device showing a lock-up clutch and the torsional vibration damper in accordance with the third exemplary embodiment of the present invention.
Figure 15:
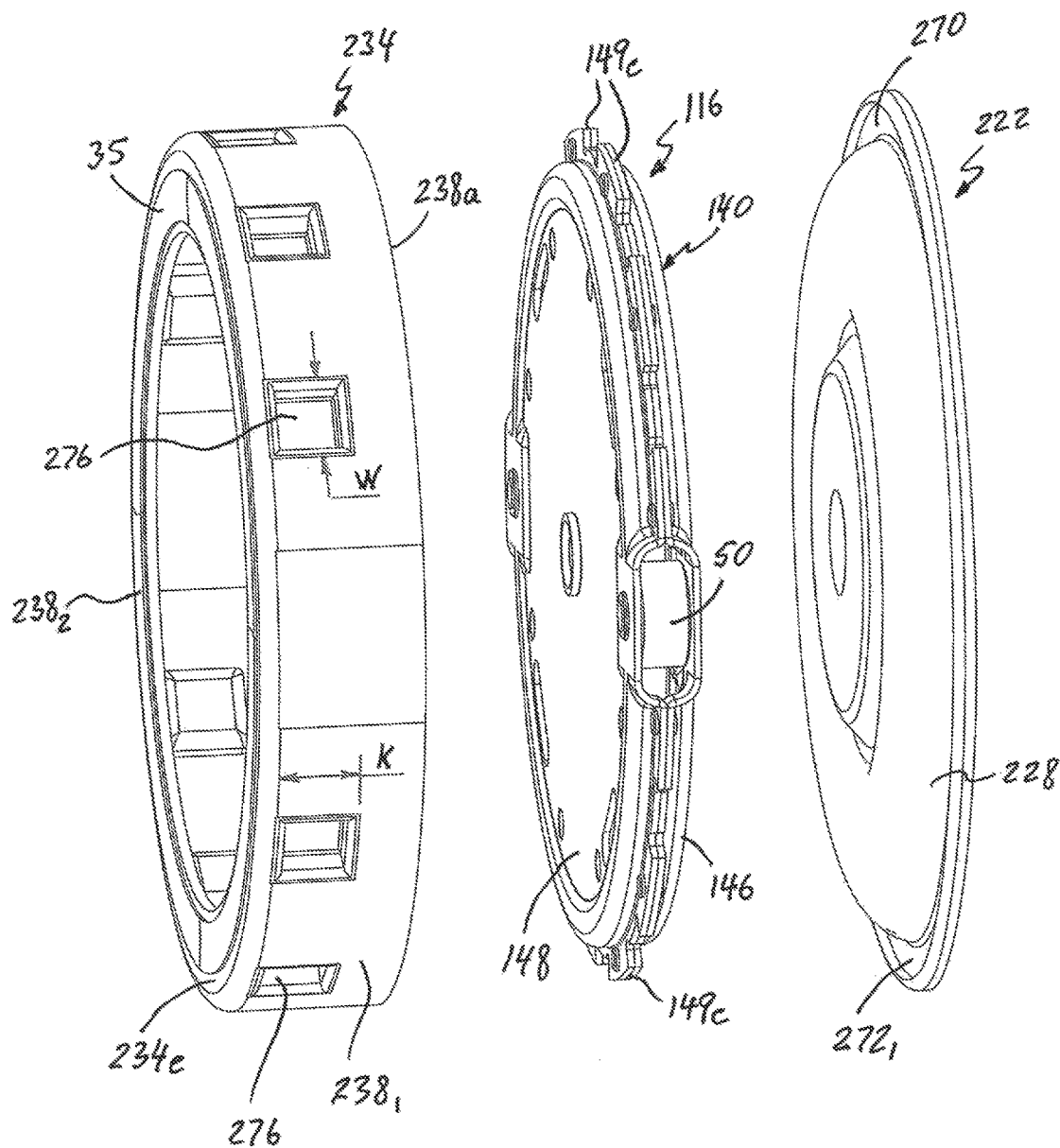
FIG. 15 is a partial exploded perspective view of the hydrokinetic torque-coupling device showing the lock-up clutch, a turbine wheel and the torsional vibration damper in accordance with the third exemplary embodiment of the present invention.

In a hydrokinetic torque-coupling device 210 of a third exemplary embodiment illustrated in FIGS. 13-15, the torque converter 14 and the lock-up clutch 115 of the second exemplary embodiment are replaced by a torque converter 214 and a lock-up clutch 215. The hydrokinetic torque-coupling device 210 of FIGS. 13-15 corresponds substantially to the hydrokinetic torque-coupling device 110 of FIGS. 8-12, and only the torque converter 214 and the lock-up clutch 215, which principally differ, will therefore be explained in detail below.

A sealed casing 212 according to the third exemplary embodiment as illustrated in FIG. 13 includes a first shell (or casing shall) $217_1$, and a second shell (or impeller shell) $217_2$ disposed coaxially with and axially opposite to the first shell $217_1$. The first and second shells $217_1$, $217_2$ are non-movably (i.e., fixedly) interconnected and sealed together about their outer peripheries, such as by weld 19.

The torque converter 214 includes an impeller wheel (sometimes referred to as the pump) 220, a turbine wheel 222, and a stator (sometimes referred to as the reactor) 224 interposed axially between the impeller wheel 220 and the turbine wheel 222. The impeller wheel 220, the turbine wheel 222, and the stator 224 are coaxially aligned with one another on the rotational axis X. The impeller wheel 220, the turbine wheel 222, and the stator 224 collectively form a torus. The impeller wheel 220 and the turbine wheel 222 may be fluidly/hydrodynamically coupled to one another as known in the art.

A portion of the second shell $217_2$ of the casing 212 also forms and serves as an impeller shell 221 of the impeller wheel 220. The impeller wheel 220 further includes a core ring 26, and a plurality of impeller blades 25 fixedly attached, such as by brazing, to the impeller shell 221. The impeller wheel, including the impeller shell 221, the core ring 26, and the blades 25, is non-rotatably secured to the drive shaft 2$a$ of the engine to rotate at the same speed as the engine crankshaft.

The turbine wheel 222 is a consolidation or incorporation of a turbine with a lockup clutch piston. The turbine component of the turbine wheel 222 includes a turbine shell 228, a core ring 30, and a plurality of turbine blades 31 fixedly attached, such as by brazing, to the turbine shell 228 and the core ring 30. Spinning of the impeller wheel 220 causes transmission fluid in the torus to spin the turbine blades 31, and hence the turbine shell 228 of the turbine wheel 222.

The impeller shell 221 and the turbine shell 228 collectively define a substantially toroidal first chamber (or torus chamber) $223_1$ therebetween. Referring to FIG. 13, the torus chamber $223_1$ is to the right side of the turbine shell 228, and a second (or damper) chamber $223_2$ is to the other (left) side of the turbine shell 228. In other words, the first chamber $223_1$ is defined between the impeller shell 221 and the turbine shell 228, while the second chamber $223_2$ is defined between the turbine shell 228 and the first shell $217_1$.

Extending axially at a radially inner peripheral end $239_1$ of the turbine shell 228 is a substantially cylindrical flange 236 that is proximate to the rotational axis. The cylindrical flange 236 of the turbine wheel 222 is rotatable relative to the driven shaft 2b. The sealing member 237, mounted to the radially inner peripheral end 239₁ of the turbine shell 228, creates a seal at the interface of the cylindrical flange 236 and the driven shaft 2b. As discussed in further detail below, the turbine wheel 222 is axially movably relative to the driven shaft 2b along this interface.

The turbine shell 228 forms both a shell component of the turbine wheel 222 and a piston component of the lockup clutch 215, as described above. The piston component of the turbine wheel 222 includes a substantially annular, planar (i.e., flat) turbine-piston flange (or turbine-piston wall) 270 extending radially outwardly from a radially outer peripheral end 239₂ of the turbine shell 228. The turbine-piston flange 270 is distal to the rotational axis X relative to the above-discussed cylindrical flange 236. The turbine-piston flange 270 is a radial extension of the turbine shell 228 and, as illustrated in FIGS. 13 and 14, is disposed radially outside of the turbine blades 31. The turbine-piston flange 270 and the turbine shell 228 are embodied as integral with one another, e.g., made of a single or unitary component, but may be separate components connected together. The turbine-piston flange 270 extends from the radially outer peripheral end 239₂ of the turbine shell 228 radially outward, transverse to rotational axis X, to terminate at an end in spaced relationship to an inner peripheral surface of an annular outer wall portion of the casing 212. The turbine-piston flange 270 has two axially opposite planar surfaces: a first surface 272₁ facing the first shell 217₁, and a second surface 272₂ facing the second shell 217₂.

The lock-up clutch 215 includes a substantially annular locking piston 234 having an engagement surface 234e facing a locking surface 218 defined on the casing shell 217₁ of the casing 212. The locking piston 234 is axially movable along the rotational axis X to and from the locking surface 218 so as to selectively engage the locking piston 234 against the locking surface 218 of the casing 212. The lock-up clutch 215 further includes an annular friction liner 35 fixedly attached to the engagement surface 234e of the locking piston 234 by any appropriate means known in the art, such as by adhesive bonding.

The locking piston 234 is affixed (i.e., non-movably attached) to the turbine shell 228, such as by an annular weld 39 and/or fasteners near a radially outer (or distal) end of the turbine-piston flange 270 of the turbine wheel 222. The locking piston 234 includes an axially extending tubular drive portion 238₁ and a substantially radially extending annular clutch portion 238₂ extending substantially radially inward from the tubular drive portion 238₁. An axially inner distal end 238a of the drive portion 238₁ of the locking piston 234 is fixedly connected to the first surface 272₁ of the turbine-piston flange 270 of the turbine-piston turbine wheel 222, such as by the weld 39 or fasteners. The weld 39 may comprise a continuous weld bead in order to avoid leaks in this area. As noted above, the casing shell 217₁ of the casing 212 includes the locking surface 218 extending substantially radially relative to the direction from the rotational axis X and facing the annular clutch portion 238₂ of the locking piston 234.

Although the drive and clutch portions 238₁ and 238₂ of the locking piston 234 are embodied as integral with one another, e.g., made by metal stamping as a single or unitary component, the drive and clutch portions 238₁ and 238₂ may be separate components integrally connected together, such as by fasteners. As best shown in FIG. 13, the clutch portion 238₂ of the locking piston 234 has an engagement surface 234e that faces the locking surface 218 of the casing 212. In accordance with the exemplary embodiment, the engagement surface 234e of the clutch portion 238₂ of the locking piston 234 is provided with the annular friction liner 35, best shown in FIGS. 13 and 14. The annular friction liner 35 may be secured to the engagement surface 234e, for example, by adhesive bonding and/or with fasteners. The annular friction liner 35 is made of a friction material for improved frictional performance. Alternatively, an annular friction liner may be secured to the locking surface 218 of the casing 212. According to still another embodiment, a first friction ring or liner is secured to the locking surface 218 of the casing 212 and a second friction ring or liner is secured to the engagement surface 234e of the locking piston 234. It is within the scope of the invention to omit one or both of the friction rings. In other words, the annular friction liner 35 may be secured to any, all, or none of the engagement surfaces.

Further according with the exemplary embodiment, the engagement surface 234e of the locking piston 234 is slightly conical to improve the engagement of the lock-up clutch 215. Specifically, the engagement surface 234e of the locking piston 234 holding the annular friction liner 35 is at an angle between 10° and 30° to improve the torque capacity of the lock-up clutch 215. Alternatively, the engagement surface 234e of the locking piston 234 may be parallel to the locking surface 218 of the casing 212.

In the third embodiment of FIGS. 13 to 15, the drive portion 238₁ of the locking piston 234 is shown extending from the turbine shell 228 axially towards the torsional vibration damper 116. The locking piston 234 axially overlaps and non-rotatably engages the torque input member 140 of the torsional vibration damper 116, irrespective of whether the locking piston 234 is in or out of lockup position. In both positions, the drive portion 238₁ of the locking piston 234 is configured to rotationally drive the torsional vibration damper 116, thus the output hub 44 of the radially elastic output member 42 of the torsional vibration damper 116.

The torsional vibration damper 116 is housed in the casing 112 axially between the turbine wheel 222 and the casing shell 217₁, as shown in FIG. 13. The locking piston 234 serves as an input for the torsional vibration damper 116. For this reason, the locking piston 234 includes at least one, preferably a plurality of axially extending openings 276 through the drive portion 238₁ thereof, as best shown in FIG. 15, each receiving one of the cogs 149c of the torque input member 140 of the torsional vibration damper 116. In other words, each of the cogs 149c of the torque input member 140 of the torsional vibration damper 116 is disposed within one of the openings 276 in the drive portion 238₁ of the locking piston 234. Moreover, each of the openings 276 is complementary to one of the cogs 149c of the torque input member 140 of the torsional vibration damper 116 such as to non-rotatably couple the locking piston 234 with the torque input member 140. Specifically, a width w of each of the through openings 276 of the locking piston 234 in the circumferential direction (best shown in FIG. 15) is substantially equal or slightly less that a width of each of the cogs 149c of the torque input member 140 in the circumferential direction.

Additionally, the locking piston 234 is axially movable relative to the first and second retainer plates 146 and 148, thus relative to the torque input member 140 of the torsional vibration damper 116. Specifically, a length k of each of the through openings 276 of the locking piston 234 in the axial direction (best shown in FIG. 15) is substantially equal or slightly less that a length of each of the cogs 149c of the torque input member 140 in the axial direction. This relative axial movement may become necessary during axial movement of the turbine shell 228. When the turbine shell 228 shifts axially due to a lockup event, which is discussed further below, the locking piston 234 with the openings 276 moves axially relative to the cogs 149*c* of the torque input member 140. Thus, the locking piston 234 is both axially and circumferentially movable relative to the torque input member 140, and generally to the torsional vibration damper 116.

The turbine wheel 222 is axially displaceable to move the engagement surface 234*e* of the clutch portion 238$_2$ of the locking piston 234 axially towards and away from the locking surface 218 of the casing 212 for positioning the hydrokinetic torque-coupling device 210 respectively into and out of a lockup mode in which the casing 212 is mechanically locked to the torque input member 140 of the torsional vibration damper 116. Axial movement of the turbine wheel 222 is accomplished by changing the pressure differential across the opposite sides of the turbine shell 228. Referring to FIG. 13, the torus chamber 223$_1$ is to the right side of the turbine shell 228, and the damper chamber 223$_2$ is to the other (left) side of the turbine shell 228. A pressure decrease in the damper chamber 223$_2$ relative to the torus chamber 223$_1$ (or stated differently a pressure increase in the torus chamber 223$_1$ relative to the damper chamber 223$_2$) shifts the turbine shell 228 axially towards the locking surface 218 of the casing 212, that is right to left in FIG. 13, into lockup mode. On the other hand, a pressure increase in the damper chamber 223$_2$ relative to the torus chamber 223$_1$ (or stated differently a pressure decrease in the torus chamber 223$_1$ relative to the damper chamber 223$_2$) shifts the turbine shell 228 axially away from the locking surface 218 of the casing 212, that is left to right in FIG. 13, out of lockup mode. Pressure changes are created by control of the fluid, e.g., hydraulic fluid or oil, in the pressure chambers 223$_1$ and 223$_2$.

In the lockup mode, the turbine shell 228 is displaced axially towards the casing shell 217$_1$ until the annular friction liner 35 of the locking piston 234 (which moves axially with the turbine shell 228) abuts against and is non-rotatably frictionally coupled to the locking surface 218 of the casing 212. In the lockup mode, torque is transferred from the engine to the casing 212, then by way of the frictional engagement between surfaces 218 and 234*e* (or the annular friction liner 35 thereof) to the torsional vibration damper 116 and the output hub 44 thereof. Thereby, the locking piston 234 and the casing 212 together create a lockup clutch 115 that bypasses the hydrodynamic fluid coupling of the torque converter 214 and mechanically non-rotatably couples the driving and driven shafts 2*a*, 2*b*. Notably, the contact between the locking surface 218 and the engagement surface 234*e* (or the annular friction liner 35) in the lockup mode creates a fluid seal, sealing the torus chamber 223$_1$ and the damper chamber 223$_2$ from one another.

In the non-lockup position, the turbine wheel 222 is displaced axially away from the casing shell 217$_1$, axially moving the locking piston 234 affixed thereto until the engagement surface 234*e* of the clutch portion 238$_2$ of the locking piston 234 (or the annular friction liner 35 thereof) is spaced from and no longer non-rotatably frictionally coupled to the locking surface 218 of the casing 212. Thus, torque transferred from the engine to the casing 212 does not bypass the torque converter 214 through the lockup clutch. Notably, in the non-lockup mode an open fluid passage is established between the locking surface 218 of the casing 212 and the engagement surface 234*e* of the clutch portion 238$_2$ of the locking piston 234. Hydraulic fluid is free to flow between the torus chamber 223$_1$ and the damper chamber 223$_2$ through the passage.

Torque received by the locked-up locking piston 234 is transmitted through the torsional vibration damper 116 to the driven shaft 2*b*, such as by splined connection. As the turbine wheel 222 and the locking piston 234 move axially into lockup position as described above, the through openings 276 in the drive portion 238$_1$ of the locking piston 234 are axially displaced relative to the cogs 149*c* of the torque input member 140 of the torsional vibration damper 116. The relative axial movement between the locking piston 234 and the torque input member 140 allows the torsional vibration damper 116 to remain fixed axially on the driven shaft 2*b* while the turbine shell 228 and the locking piston 234 move in the axial direction.

In operation, the lockup clutch 215 is usually activated after the hydraulic coupling of the driving and driven shafts, typically at relatively high speeds, in order to avoid the loss of efficiency caused in particular by slip phenomena between the turbine wheel 222 and the impeller wheel 220. Because of the axial pressures acting on the turbine wheel 222 for movement between its lockup and non-lockup positions, the turbine shell 228 may be made somewhat thicker than typical turbine shells that do not form or function as the lockup piston. Although not shown, a biasing member, such as a leaf spring, may be included in the hydrokinetic torque-coupling device 210 to axially urge the turbine wheel 222 into or out of lockup mode.

The turbine shell 228 forms both the shell component of the turbine wheel 222 and the piston component of the lockup clutch 215, as described above. By consolidating two components that are normally separate from one another into a single component, space is saved in the torque hydrokinetic torque-coupling device 210. This space-saving structure provides several design enhancements. For example, the hydrokinetic torque-coupling device 210 can be made smaller and lighter. Alternatively, the free space within the casing 212 can be used to add additional components, such as damping components. Additionally, and as discussed in greater detail below, the locking piston 234 simplifies assembly of the hydrokinetic torque-coupling device 210.

Various modifications, changes, and alterations may be practiced with the above-described embodiment. The features of the embodiments described herein may be practice with one another and are substitutable in numerous combinations.

A method for assembling the hydrokinetic torque-coupling device 210 is as follows. It should be understood that this exemplary method may be practiced in connection with the other embodiments described herein. This exemplary method is not the exclusive method for assembling the turbine assembly described herein. While the methods for assembling the hydrokinetic torque-coupling device 210 may be practiced by sequentially performing the steps as set forth below, it should be understood that the methods may involve performing the steps in different sequences.

First, the impeller wheel 220, the turbine wheel 222, the stator 224, and the torsional vibration damper 116 are provided, which may each be preassembled. The impeller wheel 220 and the turbine wheel 222 are formed by stamping from steel blanks or by injection molding of a polymeric material. The stator 224 is made by casting from aluminum or injection molding of a polymeric material. The impeller wheel 220, the turbine wheel 222 and the stator 224 subassemblies are assembled together so as to form the torque converter 214. The turbine wheel 222 is axially displaceable relative to the impeller wheel 220 and includes the turbine shell 228. The locking piston 234 of the torsional vibration damper 116 is then provided. The locking piston 234 comprises the an axially extending tubular drive portion $238_1$ and the substantially radially extending annular clutch portion $238_2$ extending substantially radially inward from the tubular drive portion $238_1$. The locking piston 234 includes a plurality of the axially extending openings 276 through the drive portion $238_1$ thereof, each complementary to one of the cogs 149c of the torque input member 140 of the torsional vibration damper 116.

Next, the drive portion $238_1$ of the locking piston 234 is non-movably attached to the turbine shell 228, such as by weld 39 or by fasteners. Then, the torsional vibration damper 116 is mounted so that the locking piston 234 drivingly (non-rotatably) engages the torque input member 140 of the torsional vibration damper 116. Specifically, the torsional vibration damper 116 is mounted so that the locking piston 234 such that the cogs 149c of the torque input member 140 of the torsional vibration damper 116 is disposed within one of the openings 276 in the drive portion $238_1$ of the locking piston 234. Then, the first shell $217_1$ having the locking surface 218 is non-movably attached to the second shell $217_2$ so as to form the casing 212 enclosing the torque converter 214, the locking piston 234, and the torsional vibration damper 116, and so that the locking surface 218 faces the engagement surface 234e of the clutch portion $238_2$ of the locking piston 234.

Figure 16:
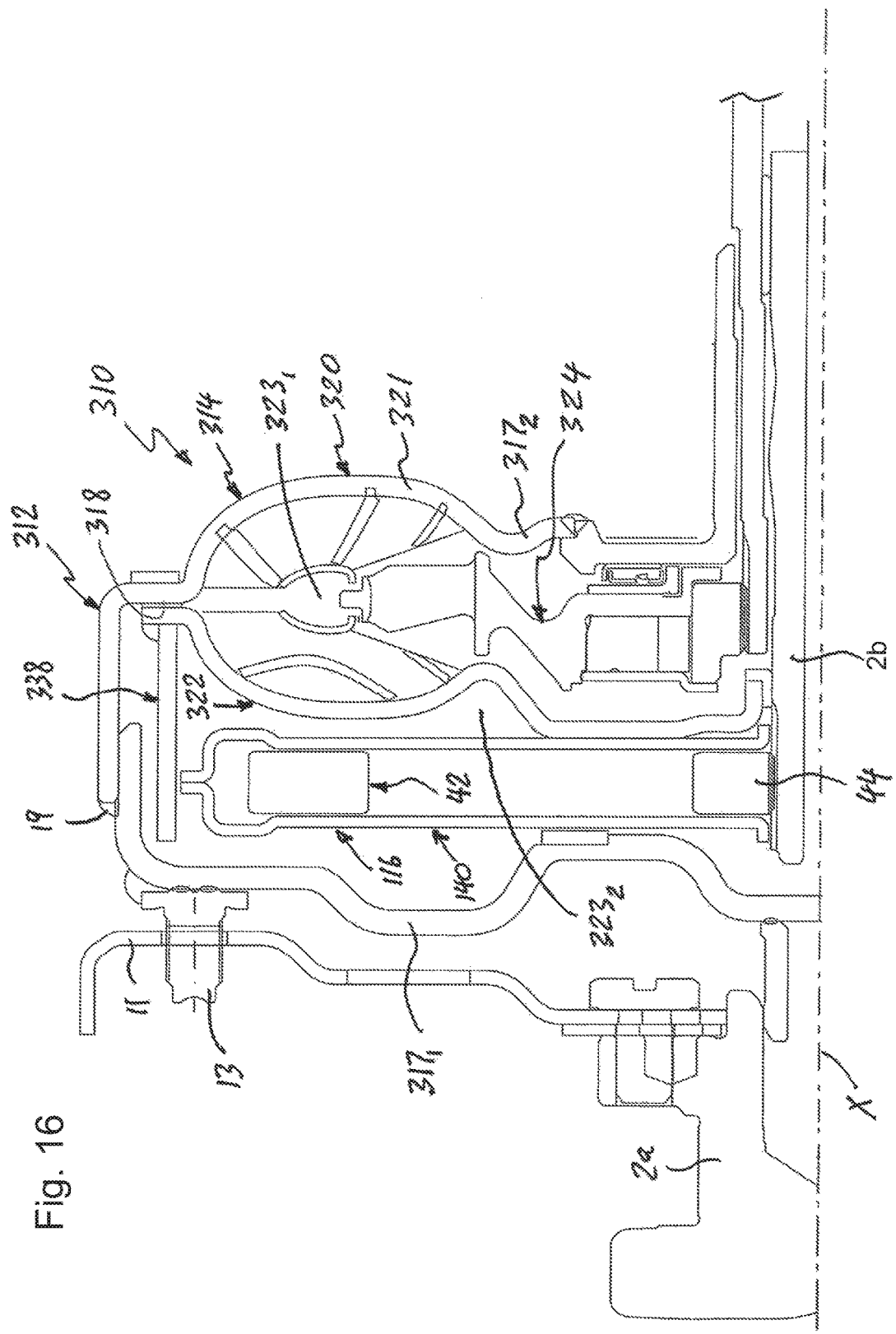
FIG. 16 is a fragmented half-view in axial section of a hydrokinetic torque-coupling device with a torsional vibration damper in accordance with a fourth exemplary embodiment of the present invention.
Figure 17:
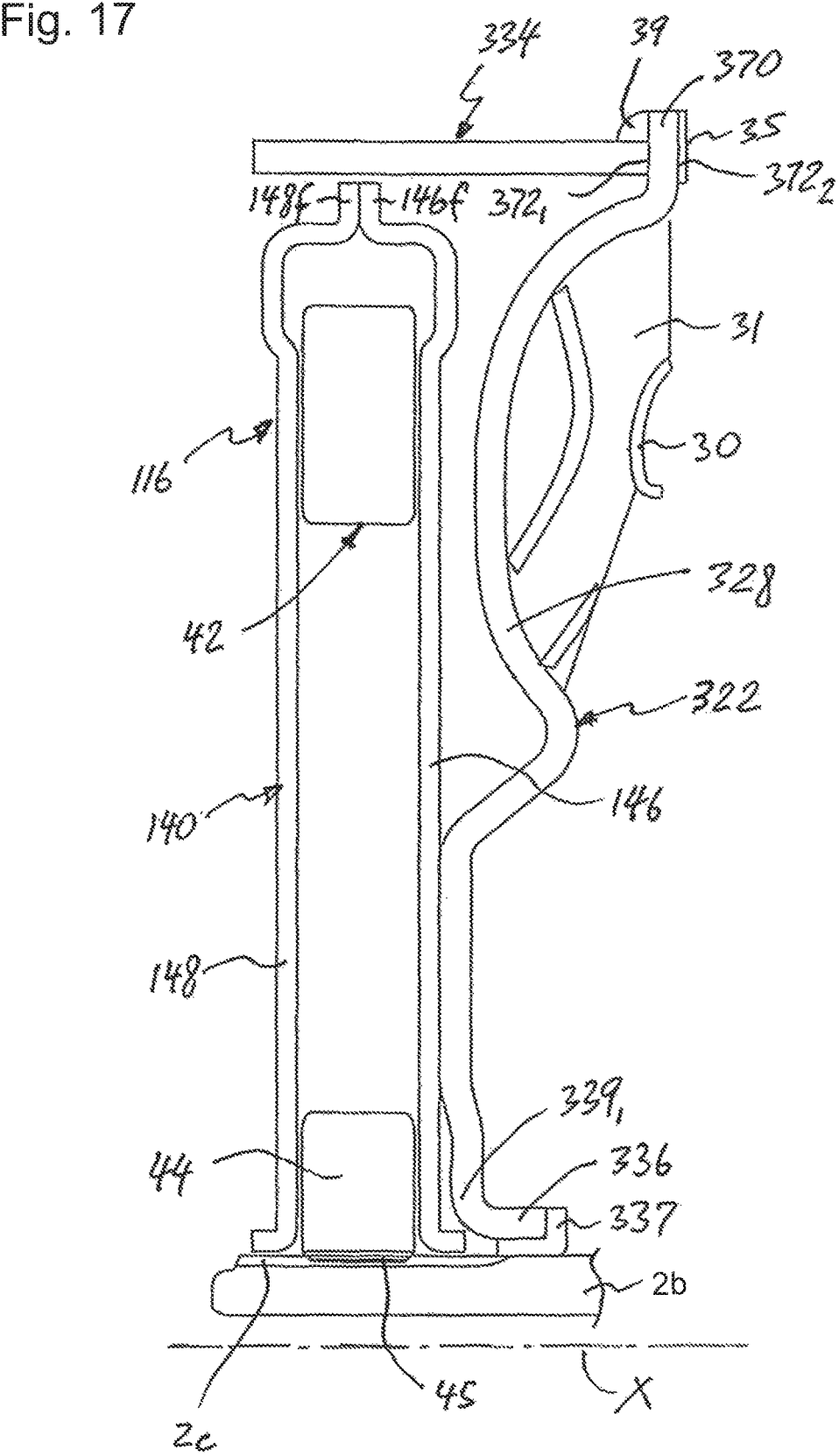
FIG. 17 is a fragmented partial half-view in axial section of the hydrokinetic torque-coupling device showing a lock-up clutch and the torsional vibration damper in accordance with the fourth exemplary embodiment of the present invention.
Figure 18:
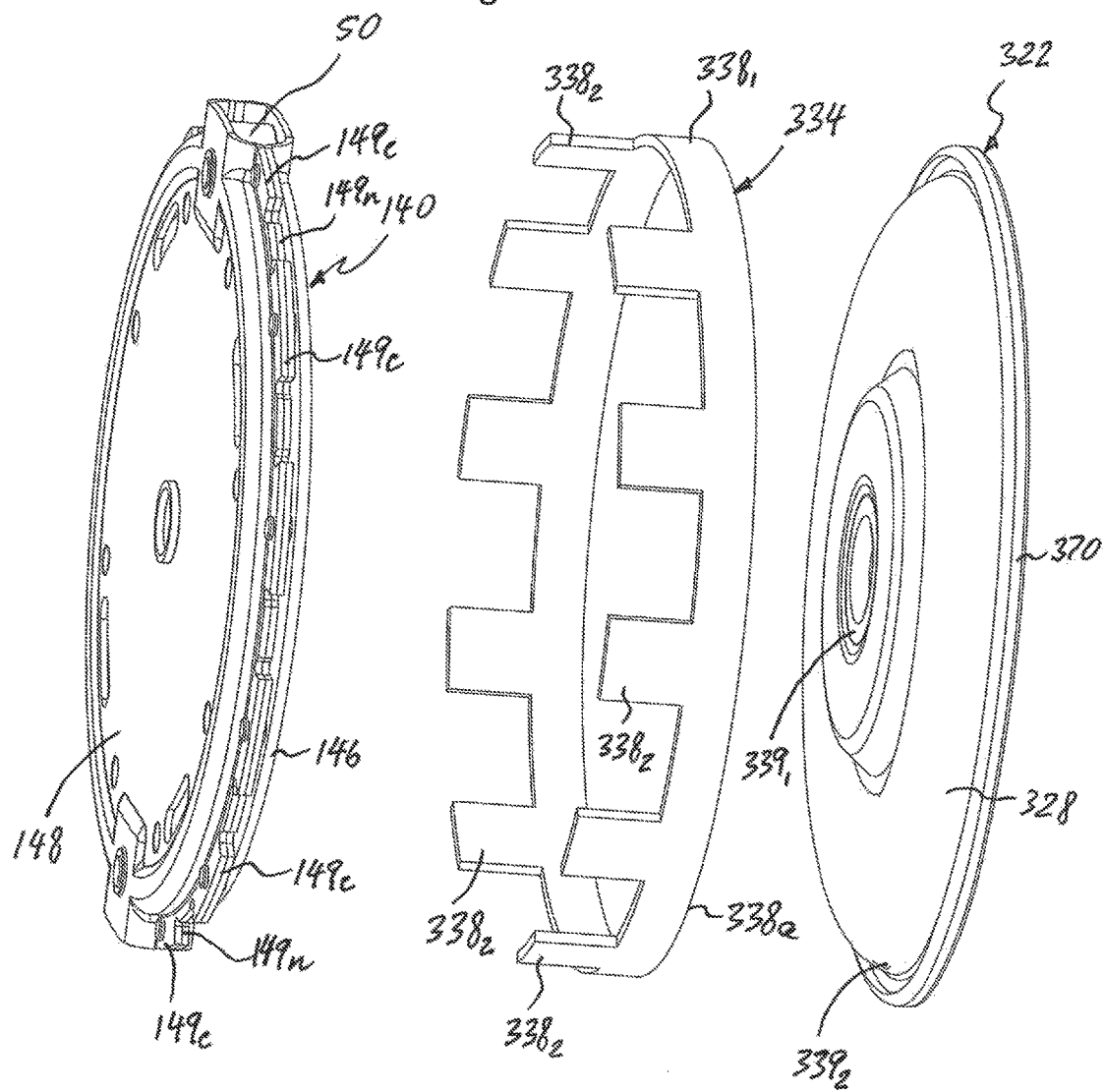
FIG. 18 is a partial exploded perspective view of the hydrokinetic torque-coupling device showing the lock-up clutch with a turbine wheel and the torsional vibration damper in accordance with the fourth exemplary embodiment of the present invention.

In a hydrokinetic torque-coupling device 310 of a fourth exemplary embodiment illustrated in FIGS. 16-18, the torque converter 214 and the lock-up clutch 215 of the third exemplary embodiment are replaced by a torque converter 314 and a lock-up clutch 315. The hydrokinetic torque-coupling device 310 of FIGS. 16-18 corresponds substantially to the hydrokinetic torque-coupling device 210 of FIGS. 13-15, and only the torque converter 314 and the lock-up clutch 315, which principally differ, will therefore be explained in detail below.

A sealed casing 312 according to the third exemplary embodiment as illustrated in FIG. 16 includes a first shell $317_1$, and a second shell $317_2$ disposed coaxially with and axially opposite to the first shell $317_1$. The first and second shells $317_1$, $317_2$ are non-movably (i.e., fixedly) interconnected and sealed together about their outer peripheries, such as by weld 19. The second shell $317_2$ of the casing 312 defines a locking surface 318 facing the first shell $317_1$. The locking surface 318 of the second shell $317_2$ is in the form of a substantially annular, planar surface and extends substantially radially outwardly relative to the rotational axis X.

The torque converter 314 includes an impeller wheel (sometimes referred to as the pump) 320, a turbine wheel 322, and a stator (sometimes referred to as the reactor) 324 interposed axially between the impeller wheel 320 and the turbine wheel 322. The impeller wheel 320, the turbine wheel 322, and the stator 324 are coaxially aligned with one another on the rotational axis X. The impeller wheel 320, the turbine wheel 322, and the stator 324 collectively form a torus. The impeller wheel 320 and the turbine wheel 322 may be fluidly/hydrodynamically coupled to one another as known in the art.

A portion of the second shell $317_2$ of the casing 312 also forms and serves as an impeller shell 321 of the impeller wheel 320. The impeller wheel 320 further includes a core ring 26, and a plurality of impeller blades 25 fixedly attached, such as by brazing, to the impeller shell 321. The impeller wheel, including the impeller shell 321, the core ring 26, and the blades 25, is non-rotatably secured to the drive shaft 2a of the engine to rotate at the same speed as the engine crankshaft.

The turbine wheel 322 is a consolidation or incorporation of a turbine with a lockup clutch piston. The turbine component of the turbine wheel 322 includes a turbine shell 328, a core ring 30, and a plurality of turbine blades 31 fixedly attached, such as by brazing, to the turbine shell 328 and the core ring 30. The spinning of the impeller wheel 320 causes transmission fluid in the torus to spin the turbine blades 31, and hence the turbine shell 328 of the turbine wheel 322.

The impeller shell 321 and the turbine shell 328 collectively define a substantially toroidal first chamber (or torus chamber) $323_1$ therebetween. Referring to FIG. 16, the torus chamber $323_1$ is to the right side of the turbine shell 328, and a second (or damper) chamber $323_2$ is to the other (left) side of the turbine shell 328. In other words, the first chamber $323_1$ is defined between the impeller shell 321 and the turbine shell 328, while the second chamber $323_2$ is defined between the turbine shell 328 and the casing shell $317_1$.

Extending axially at a radially inner peripheral end $339_1$ of the turbine shell 328 is a substantially cylindrical flange 336 that is proximate to the rotational axis. The cylindrical flange 336 of the turbine wheel 322 is rotatable relative to the driven shaft 2b. A sealing member 337, mounted to the cylindrical flange 336 of the turbine shell 328, creates a seal at the interface of the turbine shell 328 and the driven shaft 2b. As discussed in further detail below, the turbine wheel 322 is axially movably relative to the driven shaft 2b along this interface.

The turbine shell 328 forms both a shell component of the turbine wheel 322 and a piston component of the lockup clutch 315, as described above. The piston component of the turbine wheel 322 includes a substantially annular, planar (i.e., flat) turbine-piston flange (or locking piston) 370 extending radially outwardly from a radially outer peripheral end $339_2$ of the turbine shell 328. The locking piston 370 is distal to the rotational axis X relative to the above-discussed cylindrical flange 336. The locking piston 370 is a radial extension of the turbine shell 328 and, as illustrated in FIGS. 16 and 17, is disposed radially outside of the turbine blades 31. The locking piston 370 and the turbine shell 328 are embodied as integral with one another, e.g., made of a single or unitary component, but may be separate components connected together. The locking piston 370 extends from the radially outer peripheral end $339_2$ of the turbine shell 328 radially outward, transverse to rotational axis X, to terminate at an end in spaced relationship to an inner peripheral surface of an annular outer wall portion of the casing 312. The locking piston 370 extends sufficiently outward radially to at least partially axially overlap with the locking surface 318 of the casing 312.

The locking piston 370 has two axially opposite planar surfaces: a first surface $372_1$ facing the first shell $317_1$, and a second surface $372_2$ facing the second shell $317_2$. Specifically, the second surface $372_2$ of the locking piston 370 faces the locking surface 318 of the casing 312 and defines an engagement surface of the turbine-piston flange 370 of the turbine wheel 322. The locking surface 318 of the casing 312 is disposed radially outside of the impeller blades 25.

The engagement surface $372_2$ of the turbine-piston flange 370 is provided with an annular friction liner (or friction ring) 35, best shown in FIG. 17. The friction ring 35 may be secured to the engagement surface $372_2$, for example, by adhesive bonding and/or with fasteners. The friction ring 35 is made of a friction material for improved frictional performance. Alternatively, a friction ring (or friction lining)

may be secured to the locking surface 318. According to still another embodiment, a first friction ring or liner is secured to the locking surface 318 of the casing 312 and a second friction ring or liner is secured to the engagement surface $372_2$ of the turbine-piston flange 370. It is within the scope of the invention to omit one or both of the friction rings.

The hydrokinetic torque-coupling device 310 further comprises a damper-drive component 334 affixed (i.e., non-movably attached) to the turbine shell 328, such as by an annular weld 39 and/or fasteners near a radially outer (or distal) end of the turbine-piston flange 370 of the turbine wheel 322. The damper-drive component 334 includes an axially extending tubular drive portion $338_1$, and at least one and preferably a plurality of substantially identical cogs (or teeth) $338_2$. The cogs $338_2$ of the damper-drive component 334 extend substantially axially from the tubular drive portion $338_1$ toward the torque input member 140 of the torsional vibration damper 116 so as to non-rotatably engage the cogs 149c of the torque input member 140 of the torsional vibration damper 116. Specifically, each of the cogs $338_2$ of the damper-drive component 334 is complementary to one of the notches 149n of the torque input member 140 of the torsional vibration damper 116. Moreover, each of the coupling cogs $338_2$ is disposed in one of the notches 149n so as to positively engage the cogs 149c of the torque input member 140 while allowing an axial motion of the damper-drive component 334 with respect to the torque input member 140 of the torsional vibration damper 116, as best shown in FIG. 18.

An axially inner (or proximal) end 338a of the drive portion $338_1$ of the damper-drive component 334 is fixedly connected to the first surface $372_1$ of the turbine-piston flange 370 of the turbine wheel 322, such as by the weld 39 or fasteners. The weld 39 may comprise a continuous weld bead in order to avoid any leaks in this area. In other words, the damper-drive component 334 is non-movably connected to the turbine wheel 322. Accordingly, the damper-drive component 334 non-rotatably couples the turbine wheel 322 with the torque input member 140 of the torsional vibration damper 116, while allowing an axial motion of the turbine wheel 322 with respect to the torque input member 140, as best shown in FIGS. 14 and 15.

In a hydrokinetic torque-coupling device 410 of a fifth exemplary embodiment illustrated in FIGS. 19-23, the torque converter 214, the lock-up clutch 215 and the torsional vibration damper 116 of the third exemplary embodiment are replaced by a torque converter 414, a lock-up clutch 415 and a torsional vibration damper 416. The hydrokinetic torque-coupling device 410 of FIGS. 19-23 corresponds substantially to the hydrokinetic torque-coupling device 210 of FIGS. 13-15, and only the torque converter 414, the lock-up clutch 415 and the torsional vibration damper 416, which principally differ, will therefore be explained in detail below.

Figure 19:
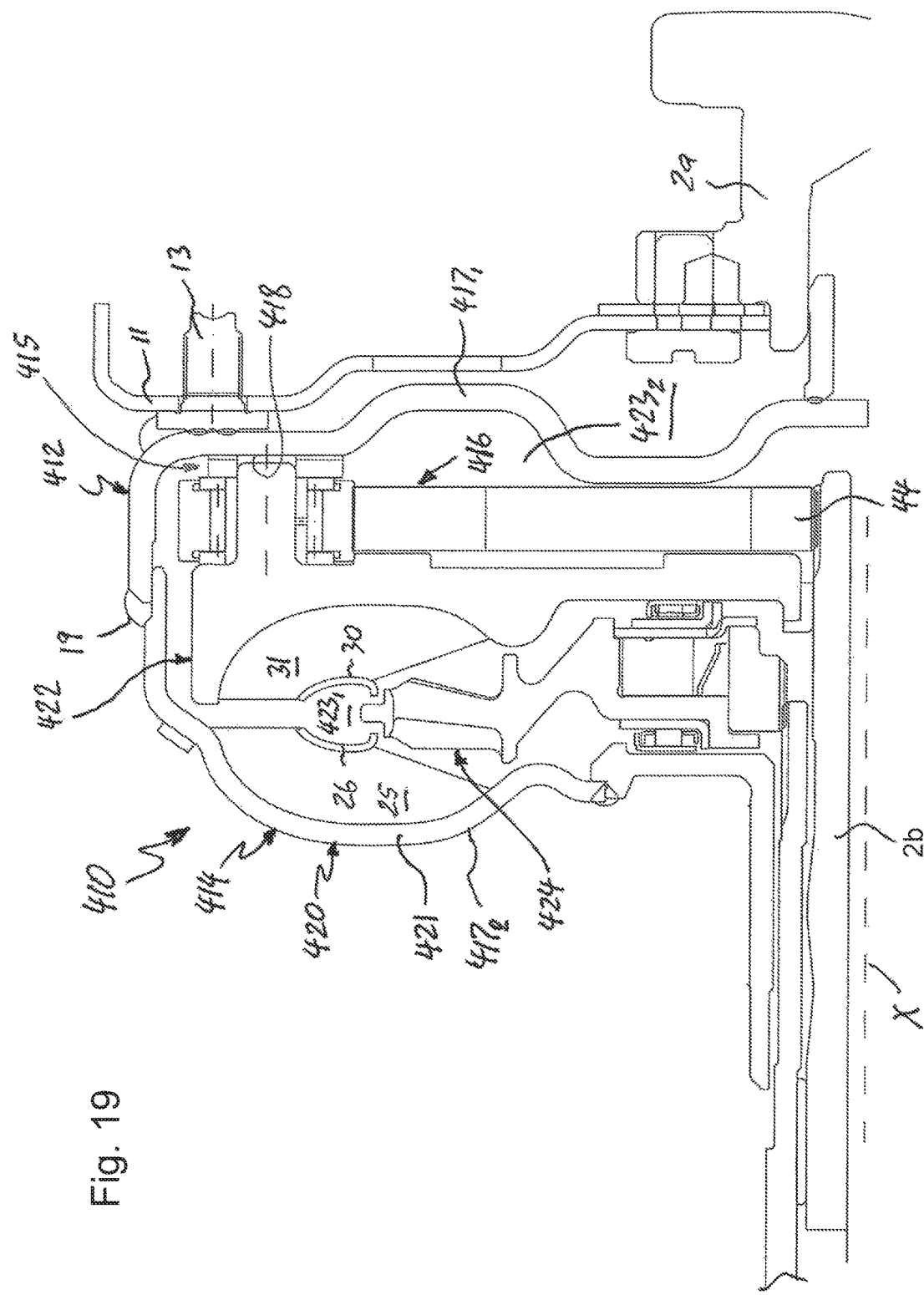
FIG. 19 is a fragmented half-view in axial section of a hydrokinetic torque-coupling device with a torsional vibration damper in accordance with a fifth exemplary embodiment of the present invention.

A sealed casing 412 according to the third exemplary embodiment as illustrated in FIG. 19 includes a first shell (or casing shell) $417_1$, and a second shell (or impeller shell) $417_2$ disposed coaxially with and axially opposite to the first shell $417_1$. The first and second shells $417_1$, $417_2$ are non-movably (i.e., fixedly) interconnected and sealed together about their outer peripheries, such as by weld 19.

The torque converter 414 includes an impeller wheel (sometimes referred to as the pump) 420, a turbine wheel 422, and a stator (sometimes referred to as the reactor) 424 interposed axially between the impeller wheel 420 and the turbine wheel 422. The impeller wheel 420, the turbine wheel 422, and the stator 424 are coaxially aligned with one another on the rotational axis X. The impeller wheel 420, the turbine wheel 422, and the stator 424 collectively form a torus. The impeller wheel 420 and the turbine wheel 422 may be fluidly/hydrodynamically coupled to one another as known in the art.

A portion of the second shell $417_2$ of the casing 412 also forms and serves as an impeller shell 421 of the impeller wheel 420. The impeller wheel 420 further includes a core ring 26, and a plurality of impeller blades 25 fixedly attached, such as by brazing, to the impeller shell 421. The impeller wheel, including the impeller shell 421, the core ring 26, and the blades 25, is non-rotatably secured to the drive shaft 2a of the engine to rotate at the same speed as the engine crankshaft.

The turbine wheel 422 is a consolidation or incorporation of a turbine with a lockup clutch piston. The turbine component of the turbine wheel 422 includes a turbine shell 428, a core ring 30, and a plurality of turbine blades 31 fixedly attached, such as by brazing, to the turbine shell 428 and the core ring 30. The turbine shell 428 of the turbine wheel 422 accordingly to the fifth exemplary embodiment is an iron casting part. Alternatively, the turbine shell 428 may be an injection molding plastic part. Spinning of the impeller wheel 420 causes transmission fluid in the torus to spin the turbine blades 31, and hence the turbine shell 428 of the turbine wheel 422.

The impeller shell 421 and the turbine shell 428 collectively define a substantially toroidal first chamber (or torus chamber) $423_1$ therebetween. Referring to FIG. 19, the torus chamber $423_1$ is to the right side of the turbine shell 428, and a second (or damper) chamber $423_2$ is to the other (left) side of the turbine shell 428. In other words, the first chamber $423_1$ is defined between the impeller shell 421 and the turbine shell 428, while the second chamber $423_2$ is defined between the turbine shell 428 and the first casing shell $417_1$.

Extending axially at a radially inner peripheral end $439_1$ of the turbine shell 428 is a substantially cylindrical flange 436 that is proximate to the rotational axis X. The cylindrical flange 436 of the turbine wheel 422 is rotatable relative to the driven shaft 2b. A sealing member 437, mounted to the radially inner peripheral end $439_1$ of the turbine shell 428, creates a seal at the interface of the cylindrical flange 436 and the driven shaft 2b. As discussed in further detail below, the turbine wheel 422 is axially movably relative to the driven shaft 2b along this interface. The turbine shell 428 forms both a shell component of the turbine wheel 422 and a piston component of the lockup clutch 415, as described above.

Figure 21:
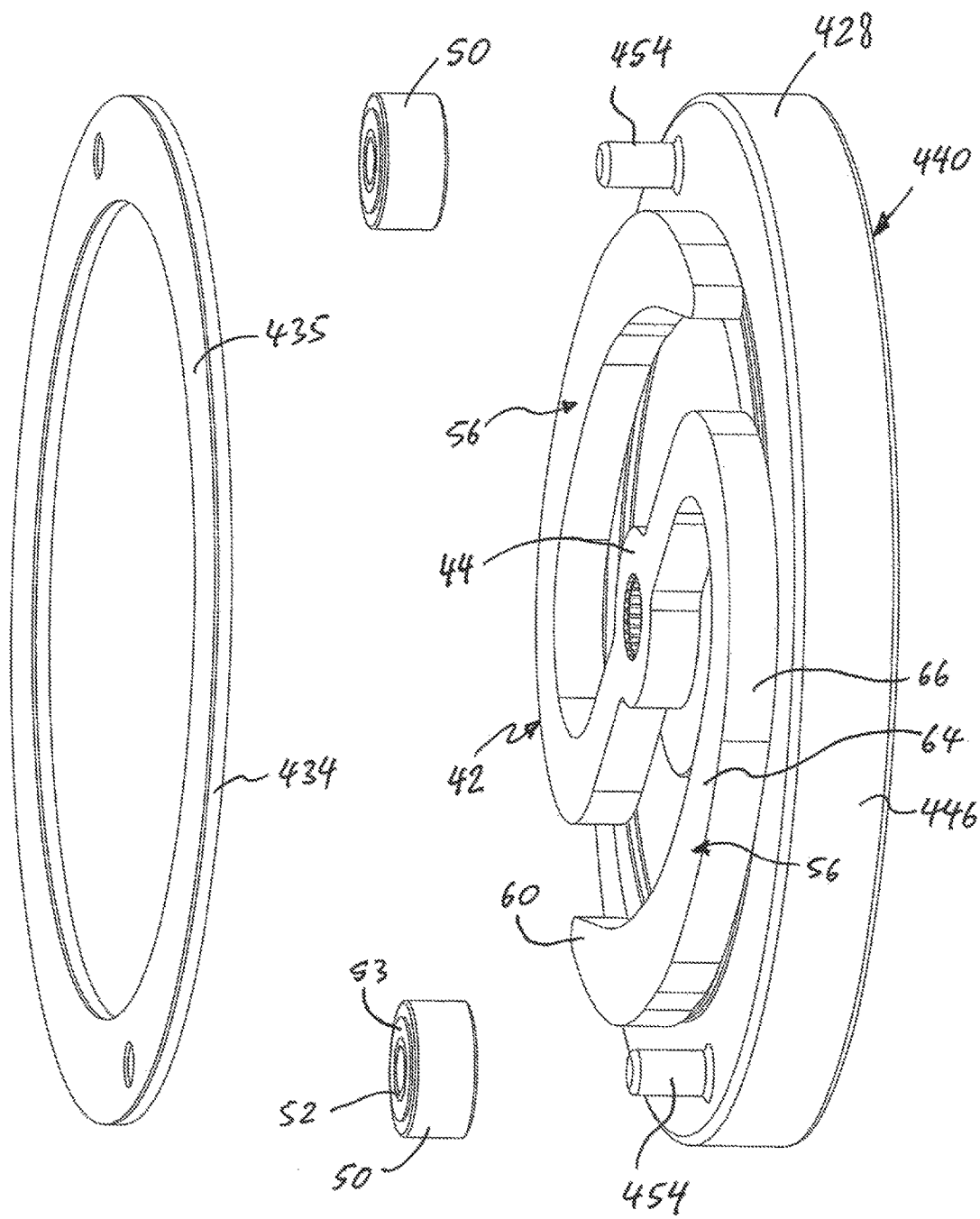
FIG. 21 is a partial exploded perspective view of the hydrokinetic torque-coupling device showing a turbine wheel, a locking piston and the torsional vibration damper in accordance with the fifth exemplary embodiment of the present invention.
Figure 22:
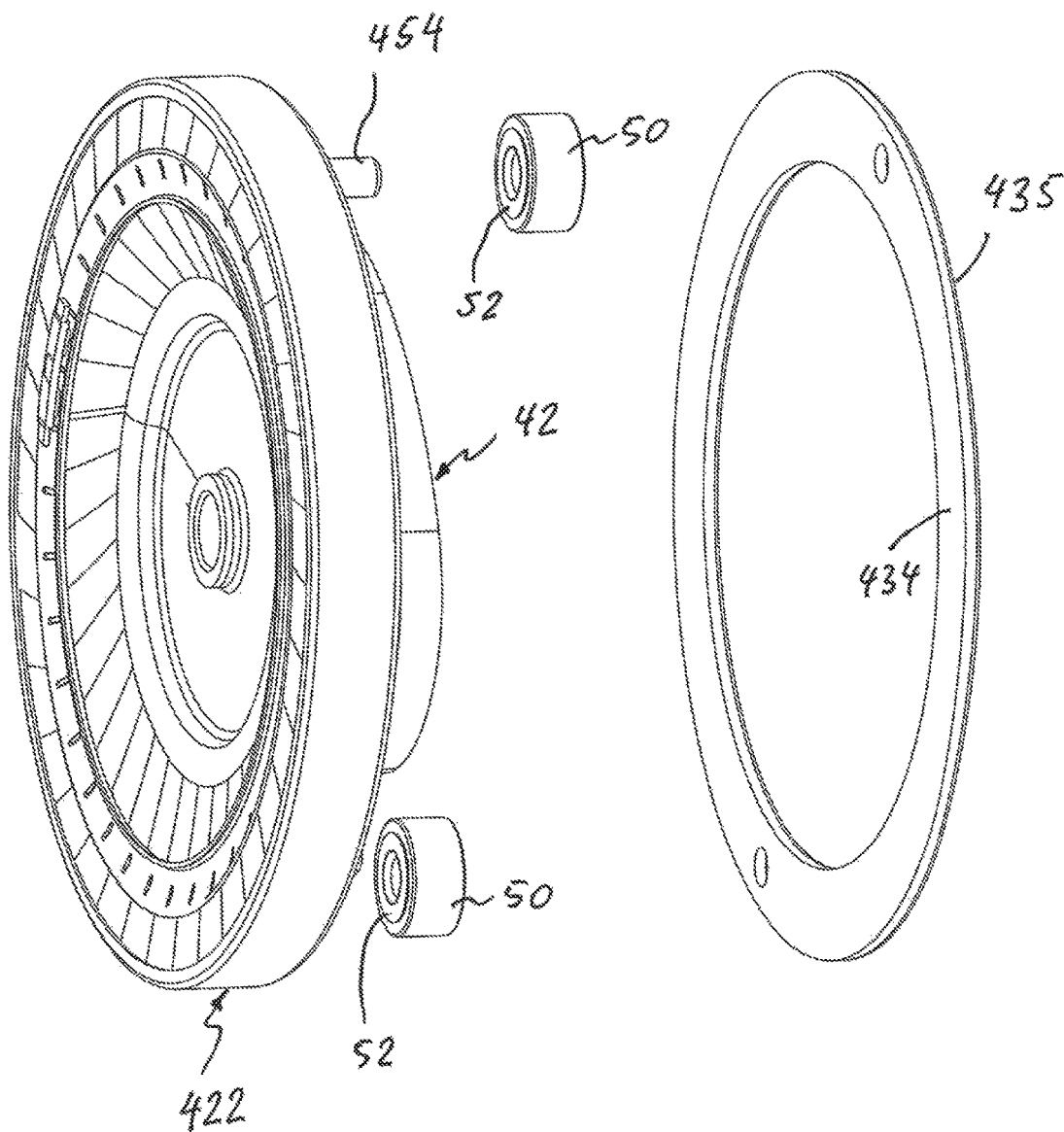
FIG. 22 is an alternative partial exploded perspective view of the hydrokinetic torque-coupling device showing the turbine wheel, the locking piston and the torsional vibration damper in accordance with the fifth exemplary embodiment of the present invention.
Figure 23:
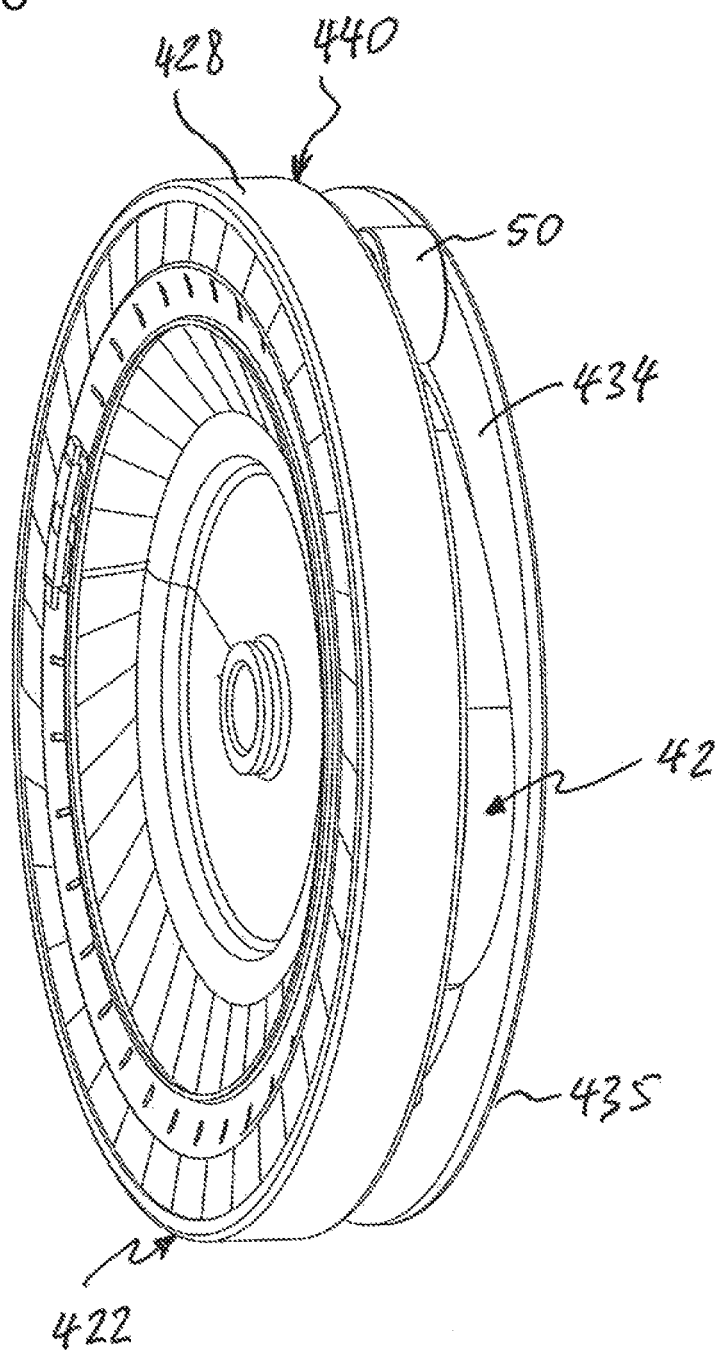
FIG. 23 is a partial perspective view of the hydrokinetic torque-coupling device showing the turbine wheel with the locking piston, and the torsional vibration damper in accordance with the fifth exemplary embodiment of the present invention.

The lock-up clutch 415 includes a substantially annular, planar (i.e., flat) locking piston 434 having an engagement surface 434e facing a locking surface 418 defined on the casing shell $417_1$ of the casing 412, as best shown in FIGS. 21-23. The locking piston 434 is non-movably attached to the turbine shell 428 and is axially movable along the rotational axis X to and from the locking surface 418 so as to selectively engage the locking piston 434 against the locking surface 418 of the casing 412. In other words, the locking piston 434 is axially movable relative to the casing shell $417_1$ of the casing 412. The lock-up clutch 415 further includes an annular friction liner 435 fixedly attached to the engagement surface 434e of the locking piston 434 by any appropriate means known in the art, such as by adhesive bonding, as best shown in FIGS. 21-23.

As noted above, the casing shell $417_1$ of the casing 412 includes the locking surface 418 extending substantially radially relative to the direction from the rotational axis X and facing the annular locking piston 434. According to the fifth embodiment of FIGS. 19 to 23, the turbine wheel 422 is axially movable toward and away from the locking surface 418 of the casing 412 between a lockup position and a non-lockup (open) position. Axial movement of the turbine wheel 422 is accomplished by changing the pressure differential across the opposite sides of the turbine shell 428. The pressure differential between the torus chamber $423_1$ and to the damper chamber $423_2$ shifts the turbine wheel 422 and the locking piston 434 affixed thereto axially toward or away from the engine, i.e., toward or away from an input side of the casing 412. Pressure changes are created by control of the fluid, e.g., hydraulic fluid or oil, in the pressure chambers $423_1$ and $423_2$.

The torsional vibration damper 416 comprises a torque input member 440 rotatable about the rotational axis X, and an integral radially elastic output member 42 elastically coupled to and rotatable relative to the torque input member 40 around the rotational axis X. The torque input member 440 includes an annular, radially oriented first retainer plate 446 in the form of the turbine shell 428.

Figure 20:
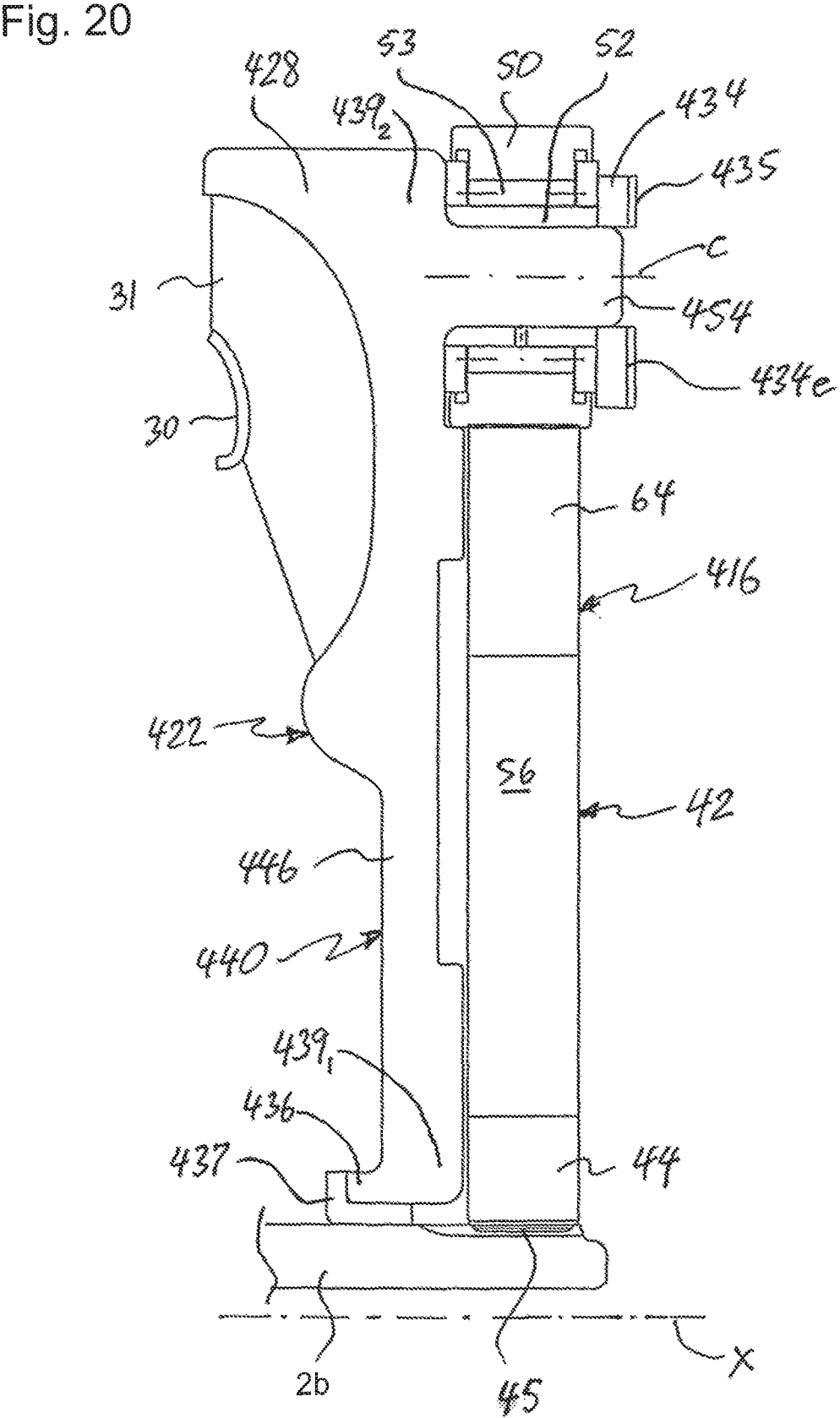
FIG. 20 is a fragmented partial half-view in axial section of the hydrokinetic torque-coupling device showing a lock-up clutch and the torsional vibration damper in accordance with the fifth exemplary embodiment of the present invention.

Moreover, the torque input member 440 further includes at least one, preferably two diametrically opposite support pins 454 extending axially from the first retainer plate 446 (i.e., the turbine shell 428) toward the casing shell $417_1$ at a radially outer peripheral end $439_2$ of the turbine shell 428 (i.e., the first retainer plate 446) that is distant to the rotational axis X, as best shown in FIGS. 20 and 21. A central axis C of each of the support pins 454 is substantially parallel to the rotational axis X, as best shown in FIG. 20?. According to the fifth exemplary embodiment, the turbine shell 428 is made unitarily (i.e., as a single piece) with the support pins 454 formed at the radially outer peripheral end $439_2$ of the turbine shell 428. In other words, the support pins 454 are non-movable relative to the turbine shell 428. Moreover, the locking piston 434 is affixed (i.e., non-movably attached) to the support pins 454 of the turbine shell 428, such as by press-fitting or welding.

The torque input member 440 further includes at least one, preferably two supporting members 50. In the exemplary embodiment, the supporting members 50 are in the form of annular rolling bodies, such as cylindrical rollers mounted to the support pins 454 of the first retainer plate 446 (i.e., the turbine shell 428) coaxially with the central axes C of the support pins 454 for rotation about the central axes C of the support pins 454. In other words, the rolling bodies 50 are rotatable around the central axes C thereof, while the support pins 454 are non-movable relative to the first retainer plate 446 of the torque input member 440.

The rolling bodies 50 are positioned so as to be diametrically opposite to one another. More specifically, the rolling bodies 50 are rotatably mounted about hollow shafts 52, which axially extend from the first retainer plate 446 toward the casing shell $417_1$ of the casing 412. The hollow shafts 52 are mounted on the first retainer plate 446 through the support pins 454 extending through the hollow shafts 52, as best shown in FIG. 20. Also, the locking piston 434 affixed to the support pins 454 of the turbine shell 428 axially secures the rolling bodies 50 and the hollow shafts 52 to the first retainer plate 446. In other words, the hollow shafts 52 axially extend between the first retainer plate 446 and the locking piston 434. Alternatively, other fasteners, such as screws or bolts may be used. The rolling bodies 50 are rotatably mounted on the hollow shafts 52 through rolling bearings 53, such as needle bearings 53, for instance, best shown in FIG. 20. Thus, the torque input member 440 with the rolling bodies 50 is axially movable relative to the casing shell $417_1$ of the casing 412.

The lock-up clutch 415 is configured to non-rotatably couple the casing 412 and the torque input member 440 (i.e., the turbine shell 428) in the engaged (locked) position, and configured to drivingly disengage the casing 412 and the torque input member 440 (i.e., the turbine shell 428) in the disengaged (open) position.

The turbine wheel 422 is axially displaceable to move the engagement surface 434e of the locking piston 434 axially towards and away from the locking surface 418 of the casing 412 for positioning the hydrokinetic torque-coupling device 410 respectively into and out of a lockup mode in which the casing 412 is mechanically locked to the torque input member 440 of the torsional vibration damper 416. Axial movement of the turbine wheel 422 is accomplished by changing the pressure differential between the opposite sides of the turbine shell 428. Referring to FIG. 19, the torus chamber $423_1$ is to the left side of the turbine shell 428, and the damper chamber $423_2$ is to the other (right) side of the turbine shell 428. A pressure decrease in the damper chamber $423_2$ relative to the torus chamber $423_1$ (or stated differently a pressure increase in the torus chamber $423_1$ relative to the damper chamber $423_2$) shifts the turbine shell 428 axially towards the locking surface 418 of the casing 412, that is left to right in FIG. 19, into lockup mode. On the other hand, a pressure increase in the damper chamber $423_2$ relative to the torus chamber $423_1$ (or stated differently a pressure decrease in the torus chamber $423_1$ relative to the damper chamber $423_2$) shifts the turbine shell 428 axially away from the locking surface 418 of the casing 412, that is right to left in FIG. 19, out of lockup mode. Pressure changes are created by control of the fluid, e.g., hydraulic fluid or oil, in the pressure chambers $423_1$ and $423_2$.

In the lockup mode, the turbine shell 428 is displaced axially towards the casing shell $417_1$ until the annular friction liner 435 of the locking piston 434 (which moves axially with the turbine shell 428) abuts against and is non-rotatably frictionally coupled to the locking surface 418 of the casing 412. In the lockup mode, torque is transferred from the engine to the casing 412, then by way of the frictional engagement between surfaces 418 and 434e (or the annular friction liner 435 thereof) to the torque input member 440 (i.e., the turbine shell 428) of the torsional vibration damper 416 and the output hub 44 thereof, which is non-rotatably coupled directly to the driven shaft 2b. Thereby, the locking piston 434 and the casing 412 together create a lockup clutch 415 that bypasses the hydrodynamic fluid coupling of the torque converter 414 and mechanically non-rotatably couples the driving and driven shafts 2a, 2b. Notably, the contact between the locking surface 418 and the engagement surface 434e (or the annular friction liner 435) in the lockup mode creates a fluid seal, sealing the torus chamber $423_1$ and the damper chamber $423_2$ from one another.

In the non-lockup mode, the turbine wheel 422 is displaced axially away from the casing shell $417_1$, axially moving the locking piston 434 affixed thereto until the engagement surface 434e of the locking piston 434 (or the annular friction liner 435 thereof) is spaced from and no longer non-rotatably frictionally coupled to the locking surface 418 of the casing 412. Thus, torque transferred from the engine to the casing 412 does not bypass the torque converter 414 through the lockup clutch. Notably, in the non-lockup mode an open fluid passage is established between the locking surface 418 of the casing 412 and the engagement surface 434e of the locking piston 434. Hydraulic fluid is free to flow between the torus chamber $423_1$ and the damper chamber $423_2$ through the passage. Thus, in the non-lockup mode, torque is transferred from the engine to the casing 412, then from the impeller wheel 420 hydrodynamically to the turbine wheel 422, then the output hub 44 thereof and the driven shaft 2b.

Figure 24:
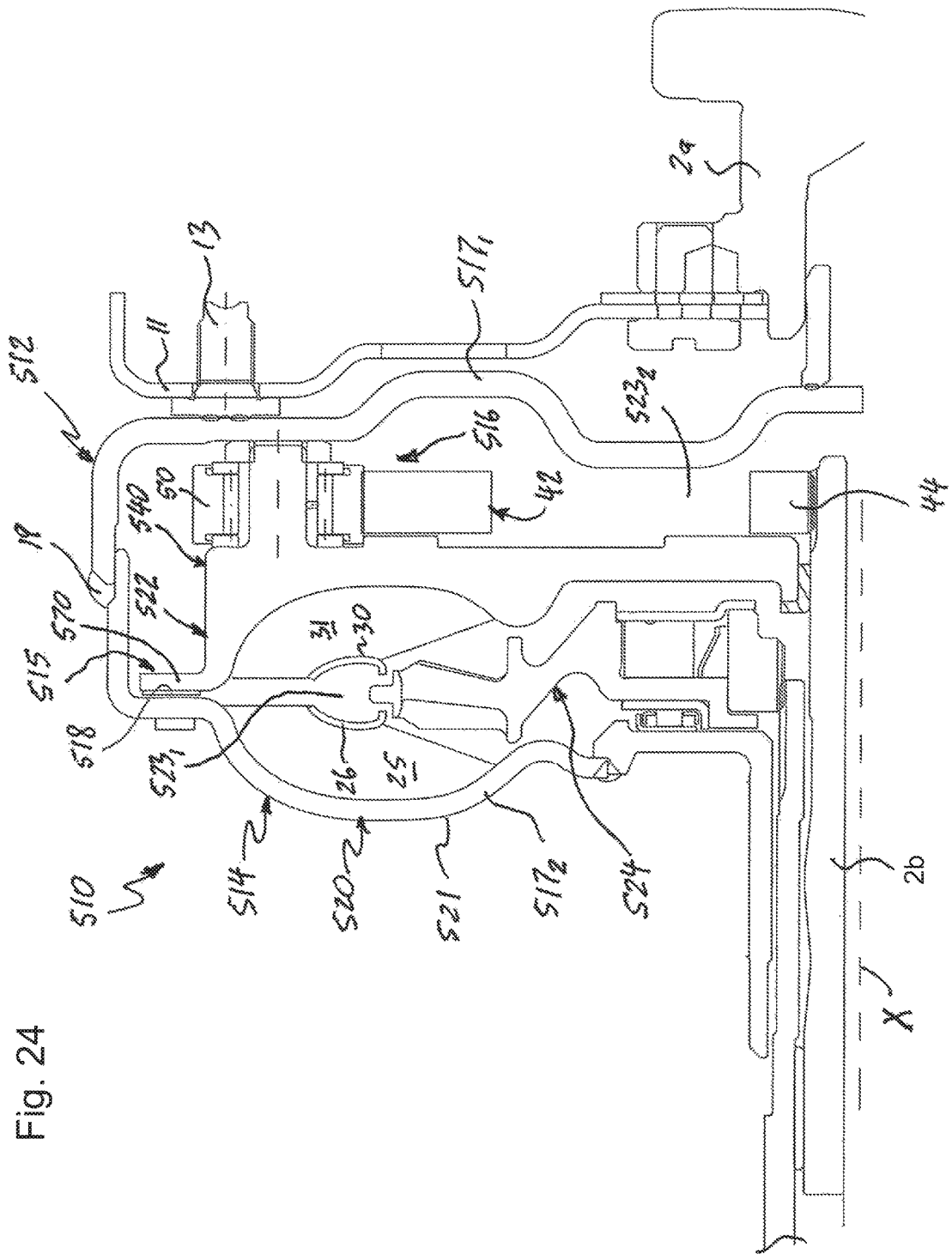
FIG. 24 is a fragmented half-view in axial section of a hydrokinetic torque-coupling device with a torsional vibration damper in accordance with a sixth exemplary embodiment of the present invention.

In a hydrokinetic torque-coupling device 510 of a sixth exemplary embodiment illustrated in FIGS. 24-26, the torque converter 314 and the lock-up clutch 315 of the fourth exemplary embodiment are replaced by a torque converter 514, a lock-up clutch 515 and a torsional vibration damper 516. The hydrokinetic torque-coupling device 510 of FIGS. 24-26 corresponds substantially to the hydrokinetic torque-coupling device 210 of FIGS. 13-15, and only the torque converter 514, the lock-up clutch 515 and the torsional vibration damper 516, which principally differ, will therefore be explained in detail below.

A sealed casing 512 according to the sixth exemplary embodiment as illustrated in FIG. 24 includes a first shell (or casing shall) 517$_1$, and a second shell (or impeller shell) 517$_2$ disposed coaxially with and axially opposite to the first shell 517$_1$. The first and second shells 517$_1$, 517$_2$ are non-movably (i.e., fixedly) interconnected and sealed together about their outer peripheries, such as by weld 19.

The torque converter 514 includes an impeller wheel (sometimes referred to as the pump) 520, a turbine wheel 522, and a stator (sometimes referred to as the reactor) 524 interposed axially between the impeller wheel 520 and the turbine wheel 522. The impeller wheel 520, the turbine wheel 522, and the stator 524 are coaxially aligned with one another on the rotational axis X. The impeller wheel 520, the turbine wheel 522, and the stator 524 collectively form a torus. The impeller wheel 520 and the turbine wheel 522 may be fluidly/hydrodynamically coupled to one another as known in the art.

A portion of the second shell 517$_2$ of the casing 512 also forms and serves as an impeller shell 521 of the impeller wheel 520. The impeller wheel 520, including the impeller shell 521, the core ring 26, and the blades 25, is non-rotatably secured to the drive shaft 2a of the engine to rotate at the same speed as the engine crankshaft.

The turbine wheel 522 is a consolidation or incorporation of a turbine with a lockup clutch piston. The turbine component of the turbine wheel 522 includes a turbine shell 528, a core ring 30, and a plurality of turbine blades 31 fixedly attached, such as by brazing, to the turbine shell 528 and the core ring 30. The turbine shell 528 of the turbine wheel 522 accordingly to the sixth exemplary embodiment is an iron casting part. Alternatively, the turbine shell 528 may be an injection molding plastic part. The spinning of the impeller wheel 520 causes transmission fluid in the torus to spin the turbine blades 31, and hence the turbine shell 528 of the turbine wheel 522.

The impeller shell 521 and the turbine shell 528 collectively define a substantially toroidal first chamber (or torus chamber) 523$_1$ therebetween. Referring to FIG. 24, the torus chamber 523$_1$ is to the left side of the turbine shell 528, and a second (or damper) chamber 523$_2$ is to the other (right) side of the turbine shell 528. In other words, the first chamber 523$_1$ is defined between the impeller shell 521 and the turbine shell 528, while the second chamber 523$_2$ is defined between the turbine shell 528 and the first shell 517$_1$.

Extending axially at a radially inner peripheral end 539$_1$ of the turbine shell 528 is a substantially cylindrical flange 536 that is proximate to the rotational axis X. The cylindrical flange 536 of the turbine wheel 522 is rotatable relative to the driven shaft 2b. A sealing member 537, mounted to the cylindrical flange 536 of the turbine shell 528, creates a seal at the interface of the cylindrical flange 536 and the driven shaft 2b. As discussed in further detail below, the turbine wheel 522 is axially movably relative to the driven shaft 2b along this interface.

The turbine shell 528 forms both a shell component of the turbine wheel 522 and a piston component of the lockup clutch 515, as described above. The piston component of the turbine wheel 522 includes a substantially annular, planar (i.e., flat) locking piston (or turbine-piston flange) 570 extending radially outwardly from a radially outer peripheral end 539$_2$ of the turbine shell 528. The locking piston 570 is distal to the rotational axis X relative to the above-discussed cylindrical flange 536. The locking piston 570 is a radial extension of the turbine shell 528 and, as illustrated in FIGS. 24 and 25, is disposed radially outside of the turbine blades 31. The locking piston 570 and the turbine shell 528 are embodied as integral with one another, e.g., made of a single or unitary component, but may be separate components connected together. The locking piston 570 extends from the radially outer peripheral end 539$_2$ of the turbine shell 528 radially outward, transverse to the rotational axis X, to terminate at an end in spaced relationship to an inner peripheral surface of an annular outer wall portion of the casing 512. The locking piston 570 extends sufficiently outward radially to at least partially axially overlap with a locking surface 518 of the casing 512.

The locking piston 570 has two axially opposite planar surfaces, including a first surface 572$_1$ facing the first shell 517$_1$, and a second surface 572$_2$ facing the second shell 517$_2$. Specifically, the second surface 372$_2$ of the locking piston 570 faces the locking surface 518 of the casing 512 and defines an engagement surface of the locking piston 570 of the turbine wheel 522. The locking surface 518 of the casing 512 is defined on the first shell 517$_1$ (i.e., the impeller shell) of the casing 512 and is disposed radially outside of the impeller blades 25.

The engagement surface 572$_2$ of the locking piston 570 is provided with an annular friction liner (or friction ring) 535, best shown in FIG. 25. The friction ring 535 may be secured to the engagement surface 572$_2$, for example, by adhesive bonding and/or with fasteners. The friction ring 535 is made of a friction material for improved frictional performance. Alternatively, a friction ring (or friction lining) may be secured to the locking surface 518. According to still another embodiment, a first friction ring or liner is secured to the locking surface 518 of the casing 512 and a second friction ring or liner is secured to the engagement surface 572$_2$ of the turbine-piston flange 570. It is within the scope of the invention to omit one or both of the friction rings.

The torsional vibration damper 516 comprises a torque input member 540 rotatable about the rotational axis X, and an integral radially elastic output member 42 elastically coupled to and rotatable relative to the torque input member 540 around the rotational axis X. The torque input member 540 includes an annular, radially oriented first retainer plate 546 in the form of the turbine shell 528.

Moreover, the torque input member 540 further includes at least one, preferably two diametrically opposite support pins 554 extending axially from the first retainer plate 546 (i.e., the turbine shell 528) toward the casing shell 517$_1$ at a radially outer peripheral end 539$_2$ of the turbine shell 528 (i.e., the first retainer plate 546) that is distant to the rotational axis X. A central axis C of each of the support pins 554 is substantially parallel to the rotational axis X, as best shown in FIG. 25. According to the sixth exemplary embodiment, the turbine shell 528 is made unitarily (i.e., as a single piece) with the support pins 554 formed at the radially outer peripheral end 539$_2$ of the turbine shell 528.

The torque input member 540 further includes at least one, preferably two supporting members 50. In the exemplary embodiment, the supporting members 50 are in the form of annular rolling bodies, such as cylindrical rollers mounted to the support pins 554 of the first retainer plate 546 (i.e., the turbine shell 528) coaxially with the central axes C of the support pins 554 for rotation about the support pins 554. In other words, the rolling bodies 50 are rotatable around the central axes C thereof, while the support pins 554 are non-movable relative to the first retainer plate 546 of the torque input member 540.

The rolling bodies 50 are positioned so as to be diametrically opposite to one another. More specifically, the rolling bodies 50 are rotatably mounted about hollow shafts 52, which axially extend from the first retainer plate 546 toward the casing shell $517_1$ of the casing 512. The hollow shafts 52 are mounted on the first retainer plate 546 through the support pins 554 extending through the hollow shafts 52, as best shown in FIG. 25. Also, a distal end of each of the support pins 554 has a threaded section such that retaining nuts 574 are threadedly engaging the support pins 554 to axially secure the rolling bodies 50 and the hollow shafts 52 to the first retainer plate 546. In other words, the hollow shafts 52 axially extend between the first retainer plate 546 and the retaining nuts 574. Alternatively, other fasteners, such as screws or bolts may be used. The rolling bodies 50 are rotatably mounted on the hollow shafts 52 through rolling bearings, such as needle bearings 53, for instance, best shown in FIG. 25. Thus, the torque input member 540 with the rolling bodies 50 is axially movable relative to the casing shell $517_1$ of the casing 512.

The lock-up clutch 515 is configured to non-rotatably couple the casing 512 and the torque input member 540 (i.e., the turbine shell 528) in the engaged (locked) position, and configured to drivenly disengage the casing 512 and the torque input member 540 (i.e., the turbine shell 528) in the disengaged (open) position.

The turbine wheel 522 is axially displaceable to move the engagement surface $572_2$ of the locking piston 570 axially towards and away from the locking surface 518 of the casing 512 for positioning the hydrokinetic torque-coupling device 510 respectively into and out of a lockup mode in which the casing 512 is mechanically (frictionally) locked to the torque input member 540 of the torsional vibration damper 516. Axial movement of the turbine wheel 522 is accomplished by changing the pressure differential between the opposite sides of the turbine shell 528. Referring to FIG. 24, the torus chamber $523_1$ is to the left side of the turbine shell 528, and the damper chamber $523_2$ is to the other (right) side of the turbine shell 528. A pressure increase in the damper chamber $523_2$ relative to the torus chamber $523_1$ (or stated differently a pressure decrease in the torus chamber $523_1$ relative to the damper chamber $523_2$) shifts the turbine shell 528 axially towards the locking surface 518 of the casing 512, that is right to left in FIG. 24, into lockup mode. On the other hand, a pressure decrease in the damper chamber $523_2$ relative to the torus chamber $523_1$ (or stated differently a pressure increase in the torus chamber $523_1$ relative to the damper chamber $523_2$) shifts the turbine shell 528 axially away from the locking surface 518 of the casing 512, that is left to right in FIG. 24, out of lockup mode. Pressure changes are created by control of the fluid, e.g., hydraulic fluid or oil, in the pressure chambers $523_1$ and $523_2$.

In the lockup mode, the turbine shell 528 is displaced axially towards the impeller shell $517_2$ until the annular friction liner 535 of the locking piston 534 (which moves axially integrally with the turbine shell 528) abuts against and is non-rotatably frictionally coupled to the locking surface 518 of the casing 512. In the lockup mode, torque is transferred from the engine to the casing 512, then by way of the frictional engagement between surfaces 518 and $572_2$ (or the annular friction liner 535 thereof) to the torque input member 540 (i.e., the turbine shell 528) of the torsional vibration damper 516 and the output hub 44 thereof, which is non-rotatably coupled directly to the driven shaft 2b. Thereby, the locking piston 534 and the casing 512 together create the lockup clutch 515 that bypasses the hydrodynamic fluid coupling of the torque converter 514 and mechanically non-rotatably couples the driving and driven shafts 2a, 2b. Notably, the contact between the locking surface 518 and the engagement surface $572_2$ (or the annular friction liner 535) in the lockup mode creates a fluid seal, sealing the torus chamber $523_1$ and the damper chamber $523_2$ from one another.

In the non-lockup mode, the turbine wheel 522 is displaced axially away from the impeller shell $517_2$, axially moving the locking piston 534 affixed thereto until the engagement surface $572_2$ of the locking piston 534 (or the annular friction liner 535 thereof) is spaced from and no longer non-rotatably frictionally coupled to the locking surface 518 of the casing 512. Thus, torque transferred from the engine to the casing 512 does not bypass the torque converter 514 through the lockup clutch 515. Notably, in the non-lockup mode an open fluid passage is established between the locking surface 518 of the casing 512 and the engagement surface $572_2$ of the locking piston 534. Hydraulic fluid is free to flow between the torus chamber $523_1$ and the damper chamber $523_2$ through the passage. Thus, in the non-lockup mode, torque is transferred from the engine to the casing 512, then from the impeller wheel 520 hydrodynamically to the turbine wheel 522, then the output hub 44 thereof, and from the output hub 44 directly to the driven shaft 2b.

The foregoing description of the exemplary embodiments of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. A hydrokinetic torque-coupling device for coupling a driving shaft and a driven shaft together, comprising:
   a casing rotatable about a rotational axis and having a locking surface;
   a torque converter including an impeller wheel rotatable about the rotational axis and a turbine wheel disposed in the casing coaxially with the rotational axis, the turbine wheel disposed axially opposite to the impeller wheel and hydro-dynamically rotationally drivable by the impeller wheel;

a lock-up clutch including a locking piston axially moveable along the rotational axis to and from the locking surface of the casing, the locking piston having an engagement surface configured to selectively frictionally engage the locking surface of the casing to position the hydrokinetic torque-coupling device into and out of a lockup mode in which the locking piston is mechanically frictionally locked to the casing so as to be non-rotatable relative to the casing; and a torsional vibration damper comprising
   a torque input member including a radially oriented first retainer plate and at least one supporting member mounted thereto; and
   a unitary radially elastic output member pivotable relative to and elastically coupled to the torque input member;
   the radially elastic output member including an annular output hub coaxial with the rotational axis and rotatable relative the torque input member, and at least one curved elastic leaf integral with the output hub and configured to elastically and radially engage the at least one supporting member and to elastically bend in the radial direction upon rotation of the first retainer plate with respect to the radially elastic output member;
   the at least one curved elastic leaf having a proximal end non-moveably connected to the output hub, a free distal end and a curved raceway portion disposed between the proximal and free distal ends of the at least one elastic leaf for bearing the at least one supporting member;
   the annular output hub of the radially elastic output member being configured for directly and non-rotatably engaging the driven shaft; and
   the locking piston of the lock-up clutch non-rotatably connected to the torque input member of the torsional vibration damper.

2. The hydrokinetic torque-coupling device of claim 1, wherein the impeller wheel includes an impeller shell and the turbine wheel includes a turbine shell disposed axially opposite the impeller shell, wherein the casing includes the impeller shell and a casing shell non-moveably connected to the impeller shell to establish the casing, and wherein one of the casing shell and the impeller shell has the locking surface.

3. The hydrokinetic torque-coupling device as defined in claim 1, wherein an annular inner peripheral surface of the output hub has a plurality of splines configured to directly engage the driven shaft.

4. The hydrokinetic torque-coupling device as defined in claim 1, wherein the at least one supporting member includes at least one support pin extending axially from the first retainer plate and at least one annular rolling body coaxially mounted on the at least one support pin for rotation around a central axis thereof.

5. The hydrokinetic torque-coupling device as defined in claim 1, wherein the torque input member further includes at least one radially oriented second retainer plate, which is axially spaced from and non-moveably attached to the first retainer plate.

6. The hydrokinetic torque-coupling device as defined in claim 1, wherein the torque input member includes two radially oriented second retainer plates each axially spaced from and non-moveably attached to the first retainer plate.

7. The hydrokinetic torque-coupling device as defined in claim 1, wherein the torque input member includes a single radially oriented second retainer plate, which is substantially identical to, axially spaced from and non-moveably attached to the first retainer plate.

8. The hydrokinetic torque-coupling device as defined in claim 1, wherein the first retainer plate of the torque input member of the torsional vibration damper is the turbine wheel of the torque converter, and wherein the at least one supporting member includes at least one support pin extending axially from the turbine wheel of the torque converter and at least one annular rolling body coaxially mounted on the at least one support pin for rotation around a central axis thereof.

9. The hydrokinetic torque-coupling device as defined in claim 8, wherein the at least one support pin is unitary with and extends axially from the turbine wheel of the torque converter toward the casing.

10. The hydrokinetic torque-coupling device as defined in claim 9, wherein the locking piston is non-moveably attached to the at least one support pin of the torsional vibration damper so as to axially secure the at least one rolling body to the at least one support pin.

11. The hydrokinetic torque-coupling device as defined in claim 1, wherein the turbine wheel of the torque converter is non-moveably attached to the output hub of the radially elastic output member.

12. The hydrokinetic torque-coupling device as defined in claim 1, wherein the turbine wheel of the torque converter is non-moveably attached to the torque input member of the torsional vibration damper.

13. The hydrokinetic torque-coupling device as defined in claim 1, wherein the turbine wheel of the torque converter is axially moveable relative to and non-rotatably coupled to the torque input member of the torsional vibration damper.

14. The hydrokinetic torque-coupling device as defined in claim 1, wherein the locking piston is non-moveably attached to the torque input member of the torsional vibration damper.

15. The hydrokinetic torque-coupling device as defined in claim 1, wherein the locking piston is non-moveably attached to the turbine wheel of the torque converter.

16. The hydrokinetic torque-coupling device as defined in claim 1, further comprising at least one stop member non-moveably attached to an outer surface of the turbine wheel facing the torque input member of the torsional vibration damper, and at least one connection member configured to drivingly engage a stop edges of the at least one stop member so as to angularly limit the rotational movement of the torque input member of the torsional vibration damper relative to the turbine wheel.

17. The hydrokinetic torque-coupling device as defined in claim 1, wherein the turbine wheel of the torque converter is axially moveable along the rotational axis relative to the impeller wheel to and from the locking surface of the casing.

18. A method for assembling a hydrokinetic torque-coupling device for coupling a driving shaft and a driven shaft together, the method comprising the steps of:
   providing a casing having a locking surface;
   providing a torque converter comprising an impeller wheel and a turbine wheel;
   providing a locking piston having an engagement surface configured to selectively frictionally engage the locking surface of the casing to position the hydrokinetic torque-coupling device into and out of a lockup mode in which the locking piston is mechanically frictionally locked to the casing so as to be non-rotatable relative to the casing;
   providing a torsional vibration damper comprising a torque input member including a radially oriented first retainer plate and at least one supporting member mounted thereto; and a unitary radially elastic output member rotatable relative to and elastically coupled to the torque input member;

the radially elastic output member includes an annular output hub coaxial with the rotational axis and rotatable relative the torque input member, and at least one curved elastic leaf integral with the output hub and configured to elastically and radially engage the at least one supporting member and to elastically bend in the radial direction upon rotation of the first retainer plate with respect to the radially elastic output member;

the at least one curved elastic leaf having a proximal end non-moveably connected to the output hub, a free distal end and a curved raceway portion disposed between the proximal and free distal ends of the at least one elastic leaf for bearing the at least one supporting member;

the annular output hub of the radially elastic output member being configured for directly and non-rotatably engaging the driven shaft; and non-rotatably connecting the locking piston to the torque input member of the torsional vibration damper so that the engagement surface of the locking piston facing the locking surface of the casing.

19. The method as defined in claim 18, wherein an annular inner peripheral surface of the output hub has a plurality of splines configured to directly engage the driven shaft.

20. The method as defined in claim 18, wherein the at least one supporting member includes at least one support pin extending axially from the first retainer plate and an annular rolling body coaxially mounted on the at least one support pin for rotation around a central axis thereof.

* * * * *